US007035820B2

(12) United States Patent
Goodwin et al.

(10) Patent No.: US 7,035,820 B2
(45) Date of Patent: Apr. 25, 2006

(54) SYSTEMS AND METHODS FOR TRADING AND ORIGINATING FINANCIAL PRODUCTS USING A COMPUTER NETWORK

(75) Inventors: Thomas R. Goodwin, Hamilton, MA (US); Kingsley J. Greenland, II, Norfolk, MA (US); Bruce K. Hounsell, Boston, MA (US); William J. Jakubowski, Boston, MA (US)

(73) Assignee: The Debt Exchange, Inc., Boston, MA (US)

( * ) Notice: Subject to any disclaimer, the term of this patent is extended or adjusted under 35 U.S.C. 154(b) by 610 days.

(21) Appl. No.: 09/928,109

(22) Filed: Aug. 10, 2001

(65) Prior Publication Data

US 2002/0059131 A1   May 16, 2002

Related U.S. Application Data

(60) Provisional application No. 60/224,240, filed on Aug. 10, 2000.

(51) Int. Cl.
    *G06F 17/60*   (2006.01)
(52) U.S. Cl. .......................................... 705/37; 705/35
(58) Field of Classification Search ................ 705/35, 705/37
    See application file for complete search history.

(56) References Cited

U.S. PATENT DOCUMENTS

| 5,500,793 | A | 3/1996 | Deming, Jr. et al. ........ 364/401 |
| 5,611,052 | A | 3/1997 | Dykstra et al. ............. 395/238 |
| 5,636,117 | A | 6/1997 | Rothstein .................... 395/204 |
| 5,644,726 | A | 7/1997 | Oppenheimer ............. 395/238 |
| 5,664,115 | A | 9/1997 | Fraser ......................... 705/37 |
| 5,699,527 | A | 12/1997 | Davidson .................... 395/238 |
| 5,930,776 | A | 7/1999 | Dykstra et al. ............... 705/38 |
| 5,940,812 | A | 8/1999 | Tengel et al. ................ 705/38 |
| 5,946,667 | A | 8/1999 | Tull, Jr. et al. .............. 705/36 |
| 5,966,699 | A | 10/1999 | Zandi .......................... 705/38 |
| 5,983,206 | A | 11/1999 | Oppenheimer .............. 705/38 |
| 5,995,947 | A | 11/1999 | Fraser et al. ................. 705/38 |
| 6,012,047 | A | 1/2000 | Mazonas et al. ............. 705/38 |
| 6,014,643 | A | 1/2000 | Minton |
| 6,029,149 | A | 2/2000 | Dykstra et al. .............. 705/38 |

(Continued)

OTHER PUBLICATIONS

Jack Friedman et al (ed); Dictionary of Real Estate Terms; Dec. 31, 2000;Fifth edition; pp. 121-122.*

*Primary Examiner*—Alain L. Bashore
(74) *Attorney, Agent, or Firm*—McKenna Long & Aldridge LLP

(57) ABSTRACT

The invention relates to systems and methods for trading financial products over a computer network, such as the Internet. In one embodiment, the invention provides a method for trading financial products over a computer network. Seller information is received from a first client, the seller information relating to a financial product offered for sale on behalf of a seller, at least some of the seller information comprising due diligence information, the due diligence information capable of fulfilling at least a portion of a request for due diligence on the financial product. The seller information about the financial product is stored in a database. A second client is provided with an opportunity to obtain the due diligence information on behalf of a potential buyer of the financial product. A bid is stored for the financial product from the second client in the database, if it can be shown that second client has obtained the due diligence information.

22 Claims, 33 Drawing Sheets

U.S. PATENT DOCUMENTS

| | | |
|---|---|---|
| 6,058,378 A | 5/2000 | Clark et al. .................... 705/37 |
| 6,233,566 B1 | 5/2001 | Levine et al. ................. 705/37 |
| 2002/0052766 A1* | 5/2002 | Dingman et al. ............... 705/7 |
| 2002/0116236 A1* | 8/2002 | Johnson et al. ................ 705/7 |

* cited by examiner

Please attach most recent asset summary report!!!

Please attach most recent asset summary report!!!

| Monthly Payment | Maturity Date | Current Interest Rate | Fixed or Variable | If Variable, Enter Index | If Variable, Enter Margin | If Variable, Next Adjustment Date | Interest Approval Method | Performance Level | Past Due Interest |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

Please attach most recent asset summary report!!!

Please attach most recent asset summary report!!!

| # Times 30 Days Late Past Year | Is the Loan in Bankruptcy? | Loan Agreement covenant defaults? | Prepayment Penalty or Lockout? | Recourse? (Yes/No) | Guarantor's Aggregate Net Worth | Lien Position | Prior Lien Balance | Past Due Taxes | Collateral Type |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

Please attach most recent asset summary report!!!

| Advance Rate | Appraised Value | Appraised Date | Environmental Issues? | Location Description | EBITDA | EBITDA Date | Other Comments |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

| debtⓧ | about us | news | mark to market | research | sellers | glossary | help | contact us |

| All Loans | My Loans | Loan Filter | Confidetiality & Certification | Edit Profile | Edit Preferences | Log Out |

Login Successful, Welcome!
Loan Filter

Certain information available from Debtx is confidential and is subject to the confidentiality agreement signed you or your company Enter criteria on which you would like to search.
Click 'Search' button below to view loans fitting search criteria.
Click 'Save' button below to view loans fitting search criteria and to update your preferences.
Click 'Reset From Preferences' button below to display search criteria stored in your preferences.
View Loans that match criteria stored in your preferences Set Criteria

| 1 | Sponsorship | ☐ Debtx | ☐ Direct | ☐ Brokered | ☐ No Preference |
|---|---|---|---|---|---|
| 2 | Date Posted | ○ As of last two weeks | ⦿ No Preference | | |
| 3 | Loan/Collateral | ☑ Agriculture<br>☑ C&I (Business)<br>☑ 1-4 Family Residental Mortgage<br>☑ Other<br>☑ Consumer<br>☑ JDC<br>☑ Commerical and Multifanily Mortgage<br>  ☑ Lodging  ☑ Mixed Use<br>  ☑ Retail  ☑ Self Storage | ☑ Health Care<br>☑ Mobile Home park<br>☑ Warehouse | ☑ Industrial  ☑ Land<br>☑ Multi-family  ☑ Office<br>☑ Other  ☑ Unsecured | |
| 4 | Sale Structure | ○ Whole Loan | ⦿ Participation/Syndication | ⦿ No Preference | |
| 5 | Loan Balance | ☐ All<br>☐ $2 to $5 million | ☐ $0 to $250,000<br>☐ $5 to $10 million | ☐ $250,000 to million<br>☑ over $10 million | |
| 6 | Performance Level | ☑ All<br>☐ Restructured Performing | ☐ New Origination<br>☐ Sub-Performing | ☐ Seasoned Performing<br>☐ Non-Performing | |
| 7 | Region/State | United States<br>International<br>Canada | Canada<br>Central<br>International<br>North-East | Alabama<br>Alsaka<br>Alberta<br>Arizona | |
| 8 | Maturity Date | Years  ☑ All | ☐ 0-2  ☐ 2-5 | ☐ 5-10 | ☐ 10+ |
| 9 | Lein Position | ○ First | ○ Other | ⦿ No Preference | |
| 10 | Coupon | ○ Fixed | ○ Variable | ⦿ No Preference | |
| 11 | Recourse | ○ Yes | ○ No | ⦿ No Preference | |
| 12 | Call Protection | ○ Yes | ○ No | ⦿ No Preference | |
| 13 | Bid Date | ○ Within 2 weeks | ○ Beyond 2 weeks | ⦿ No Preference | |

[ Search ]  [ Reset Criteria From Preference ]  [ Save Criteria To Preference ]

Narrative

Ms. Liberty

| Reference Number | Outstanding Principal | Monthly P&I Payment | Interest Rate | Maturity Date | LTV | DSC | Recourse (Y/N) |
|---|---|---|---|---|---|---|---|
| 1776 | $29,785,318 | $237,538 | 8.30% | 02/01/10 | 80% | 1.1x | Yes |

Loan Description/History
This loan is a stand-alone note, which was originated on January 3, 2000 in the amount of $30,000,000 with a current principal balance of $29,785,318 amortizing on a 25 year schedule. Interest is fixed to maturity in February, 2010. The monthly payment is $237,538.26. The loan was funded to repay a bridge loan provided for the recent refurbishment of the site.

Collateral Description
Situated on a 4.2 acre island in a convenient location, this site is easily accessible by regularly scheduled water transport. Assembly was completed in 1886, having been shipped over in 214 crates aboard the French Frigate Isere. Designed by Frederci-Auguste Bartholdi, and made of steel, copper and concrete, the statue now features an elevator, gift shop, museum and lots of stairs. The structure is 151 feet tall, and weighs over 225 tons. Renovations were completed between 1984 and 1986. Excellent views are provided from the 25 windows on the upper floors.

Tax Issues/Escrows
The National Park Service has kept taxes current and paid timely. An abatement was recently filed, citing the assessment considerably exceeding the recent appraisal.

LTV/DSC
Based upon the recent appraisal, loan-to-value is 80%. The 11.3% cap utilized was based in part upon the estimated seasonality of the cash pow if admissions were to be charged at the site (the Park Service does not charge an admission fee). Based upon an estimated fee of $1.00 and 4.2 million visitors per year, with a 25% expense ratio, NOI is $3,150,000. Debt service annually is $2,850,456 resulting in a 1.105x debt service coverage, on an estimated basis.

Payment History
Paid as agreed, with all payments received via wire prior to the due date.

Sponsor Discussion
The National Park Service operates 373 parks throughout the United States, covering over 83 million acres, including Yellowstone, Grand Canyon National Park, the Boston Harbor Islands, and the Whitehouse. The Service has over 15,000 full-time employees, and an operating budget of approximately $1.7 billion.

The information above has been compiled by DebtX on a best efforts basis No representations or warranties are made as to its accuracy.

PAGE 1 OF 1

Fig. 11

SAMPLE STATISTICS PAGE

| | |
|---|---|
| Offering Name<br>Offering Number<br>Loan ID* | Loan Name<br>Loan Type<br>Loans in Offering |

| | | |
|---|---|---|
| Sale Structure<br>Servicing Retained/Released<br>Bid Date | Bid Type<br>Reserve Price<br>Index | Specific Sponsor<br>Seller Reference Number<br>Seller Name |

| | |
|---|---|
| Performance Level<br>Borrower Street<br>Borrower City<br>Borrower State<br>Borrower Zip<br>Form of Borrowing Entity<br>Cross-Collateralized Loans | Original Funding Date<br>Currency Type<br>Original Note Amount<br>First Loan Payment Due Date<br>Prepayment Lock-out End Date<br>Yield Maintenance End Date<br>Prepayment Terms Description |

| Prepayment Penalty Matrix | |
|---|---|
| Prepayment Penalty | Prepayment Penalty End Date |
| | |

| | |
|---|---|
| Current Balance<br>Current Balance as of Date<br>Unfunded Commitments<br>Current Maturity Date<br>Amort Mos Remaining)<br>Total Scheduled P&I Due<br>Payment Frequency<br>Grace Days Allowed<br>Paid To Date<br>Date Last Pmt Received<br># Days Interest Past Due<br>Total Payment Last 12 Mos<br># Time 30 Days Late<br># Time 60 Days Late<br># Time 90 Days Late<br>Date of Last Modification<br>Modification Code<br>Date Default Letter Sent | Current Interest Rate<br>Servicer and Trustee Fee Rate<br>Interest Rate Type<br>Next Rate Adjustment Date<br>Interest Accrual Method Code<br>Per Diem Interest<br>ARM Index Code<br>ARM Margin<br>Periodic Rate Increase Limit<br>Periodic Rate Decrease Limit<br>Lifetime Rate Cap<br>Lifetime Rate Floor<br>Rate Reset Frequency<br><br>In Bankruptcy?<br>Bankruptcy Date<br><br>Recourse (Y/N) |

| Guarantor Number | Guarantor Name | Type | Net Worth | Net Worth Date |
|---|---|---|---|---|
| | | | | |

| Escrow Type | Current Balance | As of Date |
|---|---|---|
| | | |

Fig. 12

Additional Financial Information

| | |
|---|---|
| FICO Score | Total Assets |
| | Cash |
| Debt To Worth | Intangible/Related Party Assets |
| Senior Debt to Tangible Worth | Tangible Assets |
| Current Ratio | Current Assets |
| Quick Ratio | Tangible Current Assets |
| Other Covenants | |
| | Total Liabilities |
| Total Unqualified Value | Current Liabilities |
| Collateral Advance Rate | Senior Debt |
| Reporting Frequency | Subordinated Debt |

Collateral Information

| | |
|---|---|
| Collateral Number | Name |
| Collateral Type Code | Address |
| Collateral Sub-Type | City |
| Lien Position | State |
| Prior Lien Balance | Zip Code |
| Past Due Taxes | |

| | |
|---|---|
| Year Built | Ground Lease (Y/S/N) |
| Year Last Renovated | Total Reserve Balance |
| Net Square Feet | Most Recent Appraisal Value |
| # Of Units/Beds/Rooms | Most Recent Appraisal Date |
| Number of Floors | |
| | Assessed Value |
| Number of Parking Spaces | Date Asset Expected to Be |
| Land Area (square feet) | Resolved or Foreclosed |

| | |
|---|---|
| Credit Tenant Lease | Most Recent Revenue |
| Most Recent Occupancy | Most Recent Operating Expenses |
| Number of Tenants | Most Recent NOI |
| Occupancy/# Tenants as of | Most Recent Financial As of Start |
| Date Lease Rollover Review | Most Recent Financial As of End |
| % Sq. Feet expiring 1-12 mos | Most Recent Financial Indicator |
| % Sq. Feet expiring 13-24 mos | Preceding Fiscal Year As of Start |
| % Sq Feet expiring 25-36 mos | Preceding FY Revenue |
| % Sq. Feet expiring 37-48 mos | Preceding FY Operating Expenses |
| % Sq. Feet expiring 49-60 mos | Preceding FY Year NOI |
| Largest Tenant | Preceding FY Physical Occupancy |
| SF of Largest Tenant | Second Preceding FY Start |
| 2nd Largest Tenant | Second Preceding FY Revenue |
| SF of 2nd Largest Tenant | Second Preceding FY Op. Exp. |
| 3rd Largest Tenant | Second Preceding Fiscal Year NOI |
| SF of 3rd Largest Tenant | Second Preceding FY Occupancy |
| Fiscal Year End Month | Most Recent NCF |

| | |
|---|---|
| Date of Last Inspection | Preceding Fiscal Year NCF |
| Environmental Report Type | Second Preceding FY NCF |
| Environmental Report Year | |

Fig. 13

THIS DOCUMENT AFFECTS THE RESPECTIVE LEGAL RIGHTS AND OBLIGATIONS OF THE PARTIES HERETO. ACCORDINGLY, THE PARTIES SHOULD CONSULT THEIR ATTORNEYS BEFORE EXECUTING THIS DOCUMENT.

PROMISSORY NOTE $30,000,000

Anytown, New York
As of January 3rd, 2000

FOR VALUE RECEIVED ABC DEVELOPERS, LLC, a New York limited liability company, as maker, having its principal place of business at 123 Main Street, Anytown, New York 12233 ("Borrower"), hereby unconditionally promises to pay to the order of XYZ LENDING COMPANY, a New York corporation, having an address at 100 Middle Road, Big City, New York 33345 ("Lender"), or at such other place as the holder hereof may from time to time designate in writing, the principal sum of THIRTY MILLION AND 00/100 DOLLARS ($30,000,000.00) in lawful money of the United States of America with interest thereon to be computed from the date of this Note at the Applicable Interest Rate (defined below) in accordance with the terms of this Note.

ARTICLE 1 - Payment Terms

Borrower agrees to pay sums under this Note in installments as follows:

(a) a payment of interest only on February 1, 2000;

(b) a constant payment of $220,805.43 on March 1, 2000 and on the first day of each calendar month thereafter up to and including January 1, 2010 (each, a "Payment Date"); each of the payments to be applied as follows: (i) first, to the payment of interest computed at the Applicable Interest Rate; and (ii) the balance toward the reduction of the principal sum; and (c) the balance of the principal sum and all interest thereon on February 1, 2010 (the "Maturity Date").

ARTICLE 2 - Interest

The interest rate on this Note is eight and three tenths percent (8.30%) per annum (the "Applicable Interest Rate"). Interest on the principal sum of this Note shall be calculated by multiplying the actual number of days elapsed in the applicable period by a daily rate based upon a three hundred sixty (360) day year.

PROVIDED BY:
THACHER PROFFITT & WOOD
NEW YORK, NEW YORK 10048

Fig. 14

POLICY OF TITLE INSURANCE

Issued by

NATIONAL TITLE INSURANCE COMPANY

SUBJECT TO THE EXCLUSIONS FROM COVERAGE, THE EXCEPTIONS FROM COVERAGE CONTAINED IN SCHEDULE B AND THE CONDITIONS AND STIPULATION, NATIONAL TITLE INSURANCE COMPANY, a Blank corporation, herein called the Company, insures, as of Date of Policy shown in Schedule A, against loss or damage, not exceeding the Amount of Insurance stated in Schedule A, sustained or incurred by the insured by reason of:

1. Title to the estate or interest described in Schedule A being vested other than as stated therein;

2. Any defect in or lien or encumbrance on the title;

3. Unmarketability of the title;

4. Lack of a right of access to and from the land;

5. The invalidity or unenforceability of the lien of the insured mortgage upon the title;

6. The priority of any lien or encumbrance over the lien of the insured mortgage;

7. Lack of priority of the lien of the insured mortgage over any statutory lien for services, labor or material:

(a) arising from an improvement or work related to the land which is contracted for or commenced prior to Date of Policy, or (b) arising from an improvement or work related to the land which is contracted for or commenced subsequent to Date of Policy, and which is financed in whole or in part by proceeds of the indebtedness secured by the insured mortgage which at Date of Policy the insured has advanced or is obligated to advance;

8. The invalidity or unenforceability of any assignment of the insured mortgage, provided the assignment is shown in Schedule A, or the failure of the assignment shown in Schedule A to vest title to the insured mortgage in the named insured assignee free and clear of all liens The Company will also pay the costs, attorney's fees and expenses incurred in defense of the title or the lien of the insured mortgage, as insured, but only to the extent provided in the Condition and Stipulations.

[Witness clause optional]

NATIONAL TITLE INSURANCE COMPANY

BY: _____
　　　　　　　PRESIDENT

BY: _____
　　　　　　　SECRETARY

ALTA LOAN POLICY (10/17/92)

Fig. 15

Mark to Market
*=required

| | |
|---|---|
| Loan Type * | Real Estate ▽ |
| Documentation * | Bank Documents ▽ |
| Principal Balance * | 100000 |
| As of Date | |
| Maturity Date * | 2004 |
| State/Province * | Texas ▽ |
| Location Description * | Rural ▽ |
| Monthly P&I Due | |
| Coupon * | 10    (e.g. enter 10 for 10%) |
| Fixed or Variable * | Fixed ▽ |
| Index Used (* if Fixed or Variable=Variable) | Other ▽ |
| Current Index Rate (* if Fixed or Variable=Variable) | variable    (e.g. enter 8 for 8%) |
| Margin (* if Fixed or Variable=Variable) | 2    (e.g. enter 2 for 2%) |
| Next Change Date (* if Fixed or Variable=Variable) | variable |
| Interest Accrual Method * | 30/360 ▽ |
| Performance Level * | New Origination ▽ |
| Days Past Due (* if Performance Level = Sub- or Non-) | non |
| Times 30 Days Late Past 12 Months | ▽ |
| In Bankruptcy? * | ○ Yes ● No |
| Prepayment Penalty or Lockout? * | ○ Yes ● No |
| Later of Lockout/Yeild Maintenance/Defeasance End Date (if Prepayment Penalty or Lockout=Yes) | |
| Current or Next Prepayment Penalty as % of Outstanding Principal (if Prepayment Penalty or Lockout=Yes) |     (e.g. enter 2 for 2%) |
| Current or Next Penalty End Date (if Prepayment Penalty or Lockout=Yes) | |
| Recourse?* | ○ Yes ● No |
| Guarantor/Sponsor Net Worth | |
| Lien Position * | First ▽ |
| Prior Lien Balance (* If Lien Position=Suboridinate or Other) | |
| Past Due Taxes | |
| Collateral Type * | Other ▽ |
| Collateral Quality * | A ▽ |
| Environmental Issues * | None ▽ |
| LTV * | 80    (e.g. enter 80 for 80%) |
| DSC* | 120    (e.g. enter 120 for 120%) |

812 — [ Calculate ]  [ Get Monthly Cash Flow ]  [ Get Yearly Cash Flow ]  [ More ] — 814

Please be advised that the values show are approximations using assumptions that are not necessarily accurate.

Fig. 20

Loan Modeling

Select Performance Scenario, and enter fields as appropriate. Depress the "Calculate" button to display an estima price for the loan based on the input assumptions.

Perform As Agreed
Performance Scenario: [Perform as Agreed ▼]    Yield to maturity must be entered

*=Required Fields
* Yield to Maturity:
(e.g. 10 for 10%) [10]
Override Maturity Date:
(min 6 mos, max 20 years from today) [02/08/02]

[Calculate]  [Get Monthly Cash Flow]  [Get Annual Cash Flow]  [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate

Fig. 21

Loan Modeling

Select Performance Scenario, and enter fields as appropriate. Depress the "Calculate" button to display an estimat price for the loan based on the input assumptions.

| Perform As Agreed Performance Scenario: | Perform as Agreed ▽ | 99.3 cents on the dollar. | |
|---|---|---|---|
| *=Required Fields | | | |
| * Yield to Maturity: (e.g. 10 for 10%) | 10 | | |
| Override Maturity Date: (min 6 mos, max 20 years from today) | 02/08/02 | | |
| Calculate | Get Monthly Cash Flow | Get Annual Cash Flow | Back |
| Loan Information: | | | |
| Loan Type | Comm & Multifam Mtg | Days Past Due | 0 |
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate

Fig. 22 debt[X] about us | news | mark to market | research | sellers | glossary | help | contact us
All Loans | My Loans | Loan Filter | Confidentiality & Certification | Edit Profile | Edit Preferences | Log Out Loan Modeling Select performance scenario, and enter fields as appropriate. Depress the "Calculate" button to display an estimat price for the loan based on the input assumptions.

Foreclosure
Performance Scenario: [Foreclose ▽]    Based on the assumptions provided the value of your loan is estimated to be...

*=Required Fields

* Yield to Maturity: (e.g. 10 for 10%) [15]        * Default Date [09/19/01]

Override Maturity Date: (min 6 mos, max 20 years from today) [ ]

Months From Default to Cashflow [3]    Sale Proceeds as % of Appraised Value (e.g. 80 for 80%) [80]

Percent of Cashflow Collected (e.g. 80 for 80%) [80]    Brokerage Expense as % of Sale Proceeds (e.g. 3 for 3%) [3]

Months from Cashflow to Sale [6]

|  | Dollar Amount | Period | Date (if Period is 'specific date') |
|---|---|---|---|
| Legal Expenses: |  | at default ▽ |  |
| Appraisal Expenses: |  | at default ▽ |  |
| Environmental Expenses: |  | at default ▽ |  |
| Capital Expenses: |  | at default ▽ |  |
| Taxes & Other Senior Liens Paid: |  | at default ▽ |  |
| Guarantor Recovery: |  | at default ▽ |  |

[Calculate]  [Get Monthly Cash Flow]  [Get Annual Cash Flow]  [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
|  |  | DSC | 1.00x |

Please by advised that the value shown is an approximation using assumptions that are not necessarily accurate

Fig. 24 debt[X] | about us | news | mark to market | research | sellers | glossary | help | contact us
All Loans | My Loans | Loan Filter | Confidentiality & Certification | Edit Profile | Edit Preferences | Log Out

Loan Modeling

Select performance scenario, and enter fields as appropriate Depress the "Calculate" button to display an estimat price for the loan based on the input assumptions.

| Foreclosure Performance Scenario: | Foreclose ▽ | 69.4 cents on the dollar. | |
|---|---|---|---|
| *=Required Fields | | | |
| * Yield to Maturity: (e.g. 10 for 10%) | 15 | * Default Date | 09/19/01 |
| Override Maturity Date: (min 6 mos, max 20 years from today) | | | |
| Months From Default to Cashflow | 3 | Sale Proceeds as % of Appraised Value (e.g. 80 for 80%) | 80 |
| Percent of Cashflow Collected (e.g. 80 for 80%) | 80 | Brokerage Expense as % of Sale Proceeds (e.g. 3 for 3%) | 3 |
| Months from Cashflow to Sale | 6 | | |

| | Dollar Amount | Period | Date (if Period is 'specific date') |
|---|---|---|---|
| Legal Expenses: | | at default ▽ | |
| Appraisal Expenses: | | at default ▽ | |
| Environmental Expenses: | | at default ▽ | |
| Capital Expenses: | | at default ▽ | |
| Taxes & Other Senior Liens Paid: | | at default ▽ | |
| Guarantor Recovery: | | at default ▽ | |

[Calculate] [Get Monthly Cash Flow] [Get Annual Cash Flow] [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate

Fig. 25 debt X  about us | news | mark-to market | research | sellers | glossary | help | contact us
All Loans | My Loans | Loan Filter | Confidentiality & Certification | Edit Profile | Edit Preferences | Log Out Loan Modeling Select performance scenario, and enter fields as appropriate. Depress the "Calculate" button to display an estimat price for the loan based on the input assumptions.

| Extension/Restructure Performance Scenario: | Extension/Restructure ▼ | Based on the assumption provided the value of your loan is estimated to be... | |
|---|---|---|---|
| *=Required Fields | | | |
| * Yield to Maturity: (e.g. 10 for 10%) | 15 | * Restructure/Extension Date | 09/19/01 |
| *New Maturity Date: (maximum 20 years from today) | 09/19/05 | % of Principal Refinanced (remainder is considered forgiven) | 100 |
| New Interest Rate (e.g. 10 fro 10%) | 10 | | |
| *New Amortization Schedule in Years (enter 1000 for interest only) | 20 | | |

| | Dollar Amount | Period | Date (if Period is 'specific date') |
|---|---|---|---|
| Legal Expenses. | | at default ▼ | |
| Appraisal Expenses: | | at default ▼ | |
| Environmental Expenses: | | at default ▼ | |
| Capital Expenses: | | at default ▼ | |
| Taxes & Other Senior Liens Paid: | | at default ▼ | |
| Guarantor Recovery: | | at default ▼ | |

[Calculate] [Get Monthly Cash Flow] [Get Annual Cash Flow] [>>Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate

Fig. 26 debt[X] about us | news | mark to market | research | sellers | glossary | help | contact us
All Loans | My Loans | Loan Filter | Confidentiality & Certification | Edit Profile | Edit Preferences | Log Out Loan Modeling Select performance scenario, and enter fields as appropriate. Depress the "Calculate" button to display an estimate price for the loan based on the input assumptions.

Extension/Restructure Performance Scenario: [Extension/Restructure ▽]  85.1 cents on the dollar.

*=Required Fields

* Yield to Maturity: (e.g. 10 for 10%) [15]          * Restructure/Extension Date [09/19/01]

*New Maturity Date: (maximum 20 years from today) [09/19/05]    % of Principal Refinanced (remainder is considered forgiven) [100]

New Interest Rate (e.g. 10 fro 10%) [10]

*New Amortization Schedule in Years (enter 1000 fro interest only) [20]

| | Dollar Amount | Period | Date (if Period is specific date) |
|---|---|---|---|
| Legal Expenses: | | at default ▽ | |
| Appraisal Expenses: | | at default ▽ | |
| Environmental Expenses: | | at default ▽ | |
| Capital Expenses: | | at default ▽ | |
| Taxes & Other Senior Liens Paid: | | at default ▽ | |
| Guarantor Recovery: | | at default ▽ | |

[Calculate]  [Get Monthly Cash Flow]  [Get Annual Cash Flow]  [>> Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate

Fig. 27 debt[X] about us | news | mark to market | research | sellers | glossary | help | contact us
All Loans | My Loans | Loan Help | Confidentiality & Certification | Edit Profile | Edit Preferences | Log Out

Loan Modeling

Select performance scenario, and enter fields as appropriate. Depress the "Calculate" button to display an estimate price for the loan based on the input assumptions.

| DPO/Early Payoff Performance Scenario: | DPO/Early Payoff ▽ | Based on the assumptions provided the value of your loan is estimated to be... | |
|---|---|---|---|
| *=Required Fields | | | |
| * Yield to Maturity: (e.g. 10 for 10%) | 15 | Default Date, if any | |
| *Override Maturity Date: (min 6 mos, max 20 years from today) | 02/08/02 | | |
| % of Payment Received Default to Payoff (e.g. 80 for 80%) | 80 | * DPO/Early Payoff Date | 09/27/01 |
| % of Principal Repaid (e.g. 80 for 80%) | 85 | | |
| % of Past Due Interest Paid (e.g. 80 for 80%) | 95 | | |

| | Dollar Amount | Period | Date (if Period is specific date) |
|---|---|---|---|
| Legal Expenses: | | at default ▽ | |
| Appraisal Expenses | | at default ▽ | |
| Environmental Expenses: | | at default ▽ | |
| Capital Expenses: | | at default ▽ | |
| Taxes & Other Senior Liens Paid: | | at default ▽ | |
| Guarantor Recovery: | | at default ▽ | |

[Calculate]  [Get Monthly Cash Flow]  [Get Annual Cash Flow]  [>> Back]

Loan Information

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
| | | DSC | 1.00x |

Please by advised that the value shown is an approximation using assumptions that are not necessarily accurate

Fig. 28 debt[X] | about us | news | mark to market | research | sellers | glossary | help | contact us
All Loans | My Loans | Loan Filter | Confidentiality & Certification | Edit Profile | Edit Preferences | Log Out Loan Modeling Select performance scenario, and enter fields as appropriate. Depress the "Calculate" button to display an estimate price for the loan based on the input assumptions.

DPO/Early Payoff
Performance Scenario: [DPO/Early Payoff ▼]  84.5 cents on the dollar.

*=Required Fields

* Yield to Maturity:
(e.g. 10 for 10%)  [15]   Default Date, if any  [         ]

*Override Maturity Date:
(min 6 mon, max 20 years from today)  [02/08/02]

% of Payment Received Default to Payoff (e.g. 80 for 80%)  [80]   * DPO/Early Payoff Date  [09/27/01]

% of Principal Repaid (e.g. 80 for 80%)  [85]

% of Past Due Interest Paid (e.g. 80 for 80%)  [95]

|  | Dollar Amount | Period | Date (if Period is specific date) |
|---|---|---|---|
| Legal Expenses: |  | at default ▼ |  |
| Appraisal Expenses: |  | at default ▼ |  |
| Environmental Expenses: |  | at default ▼ |  |
| Capital Expenses: |  | at default ▼ |  |
| Taxes & Other Senior Liens Paid: |  | at default ▼ |  |
| Guarantor Recovery: |  | at default ▼ |  |

[Calculate]  [Get Monthly Cash Flow]  [Get Annual Cash Flow]  [>> Back]

Loan Information:

| Loan Type | Comm & Multifam Mtg | Days Past Due | 0 |
|---|---|---|---|
| Documentation | Bank Documents | Times 30 Days Late Past 12 Months | 0 |
| Principal Balance | $5,000,000 | In Bankruptcy? | N |
| As of Date | --- | Prepayment Penalty or Lockout? | N |
| Maturity Date | 9/19/01 | Lockout/Yield Maintenance End Date | NAP |
| State | Massachusetts | Current or Next Prepayment Penalty | NAP |
| Location Description | Suburb - Excellent | Current or Next Penalty End Date | NAP |
| Monthly P & I Due | $0 | Recourse? | N |
| Coupon | 15.0000% | Guarantor/Sponsor Net Worth | $0 |
| Fixed or Variable | Fixed | Lien Position | First |
| Index Used | NAP | Prior Lien Balance | $0 |
| Current Index Rate | NAP | Past Due Taxes | $0 |
| Margin | NAP | Collateral Type | Land |
| Next Change Date | NAP | Collateral Quality | A |
| Interest Accrual Method | 30/360 | Environmental Issues | None |
| Performance Level | Seasoned Performing | LTV | 100.00% |
|  |  | DSC | 1.00x |

Please by advised that the value shown is an approximation using assumptions that are not necessarily accurate

Fig. 29

SYSTEMS AND METHODS FOR TRADING AND ORIGINATING FINANCIAL PRODUCTS USING A COMPUTER NETWORK

CROSS REFERENCE TO RELATED APPLICATION

This application claims the priority of U.S. Provisional Application Ser. No. 60/224,240 entitled "System and Method for Trading and Originating Commercial Loans Using a Computer Network" filed Aug. 10, 2000, the contents of which are incorporated herein by reference in their entirety.

FIELD OF THE INVENTION

Embodiments of the present invention generally relate to systems and methods for providing information relating to financial products such as commercial loans. More specifically, embodiments of the present invention are directed to a data processing system for buying, selling, trading, originating, and providing information on financial products over a computer network, such as the Internet.

BACKGROUND OF THE INVENTION

During the past decade, institutions having loans on their balance sheets have moved from a "hold to maturity" philosophy to a proactive portfolio management model. The larger, more sophisticated institutions first adopted the proactive portfolio management model, and this popularity of this model has migrated down to smaller institutions. Managers of such proactive portfolios, such as executives, often are concerned with four issues: liquidity, capacity, exposure, and credit risk. Such executives are increasingly recognizing the emerging secondary whole loan market as the appropriate mechanism for managing these concerns.

The secondary whole loan market is in its infancy, however and still lacks necessary efficiencies and liquidity. Trading and originating commercial loans currently is handled in a costly, labor-intensive, and time-consuming manner. The lack of a centralized clearing mechanism for commercial loans hampers both sellers and buyers of commercial loans.

Executives and other sellers of commercial loans face a number of obstacles. For example, the commercial loan market is fragmented and has no central clearing mechanism, making it difficult to locate the best buyer for a given loan. Frequently, executives are unable to inform more than a few buyers about a commercial loan opportunity. Such limited distribution of opportunities limit the efficiency with which a transaction can occur and can result in a seller not achieving the best price or terms for the sale. In addition, lack of historical transaction data impedes the ability of parties to a transaction to price assets quickly and accurately. This makes the analysis of a sell decision inefficient and time-consuming.

Even if executives overcome these obstacles, usually there is a long delay between the decision to sell and the actual execution of the sale, further complicating the process and increasing the risk of not achieving the required sale price. The inefficiencies and lack of internal resources often force executives to make less desirable decisions. For example many parties allocate internal resources to make the necessary divestitures to maintain liquidity or asset/liability maturity requirements. The parties often turn away potentially profitable new loans because of geographic, product, or borrower diversification purposes. In the case of sub or non-performing assets, the remaining choices are to employ expensive and time-consuming workout strategies or do nothing.

Investors trying to acquire loans run into many of the same problems described above. Investors also incur significant time and dollar expenses performing acquisition due diligence, and run into supply limitations due to the unpredictable nature of deal flow.

SUMMARY OF THE INVENTION

There are at least three significant obstacles to efficient secondary market trading and participation: the inability to readily price assets in relation to existing market conditions, the inability of sellers to quickly and effectively reach a broad and qualified investor audience, and the significant time and cost associated with conducting traditional due diligence.

In at least one embodiment, the invention provides publicly available mark-to-market tools that enable users to price their assets at any time. In at least one embodiment, the invention provides a pricing model that gives sellers an indication of an asset's market value given its individual characteristics and prevailing market conditions.

In at least one embodiment, the invention provides an efficient marketplace for trading commercial debt, including an open, market-driven exchange that reduces transaction costs, compresses transaction cycles, and enables extended buyer and seller participation in the secondary commercial debt market.

In at least one embodiment, the invention solves and addresses portfolio managers' concerns by providing a vertical Internet portal for the auction of commercial loans. This solution provides liquidity and efficiency in the secondary commercial loan market and enables executives to appropriately address their portfolio management needs. In another aspect, the present invention provides an Internet location that can serve as a central clearing mechanism for listing and auctioning financial products such as commercial loans. This Internet location provides benefits. First, it provides a consolidated site for sellers, buyers, agents, borrowers, and service providers to list, evaluate, solicit, and bid on loans. In addition, it is automated to compress the auction cycle and reduce overall transaction costs, which helps connect and expand the universe of buyers and sellers.

In another embodiment, the invention includes systems and methods providing quick, accurate, and free pricing information that can dramatically increase loan sale transaction volume. In still another embodiment of the invention, the portal includes proprietary pricing tools which, when coupled with historical performance data (also proprietary), can achieve extremely high execution rates for bringing loans to market. For example, one version of the proprietary pricing tools and proprietary performance data helped the inventors achieve a 97% execution rate when bringing loans to market.

These and other embodiments of the present invention help lower transaction and opportunity costs, enabling embodiments of the present invention to consolidate and dominate this fragmented and rapidly expanding market.

In at least one embodiment, the invention provides a method for trading financial products over a computer network. Seller information is received from a first client, the seller information relating to a financial product offered for sale on behalf of a seller, at least some of the seller information comprising due diligence information, the due diligence information capable of fulfilling at least a portion of a request for due diligence on the financial product. The seller information about the financial product is stored in a database. A second client is provided with an opportunity to obtain the due diligence information on behalf of a potential buyer of the financial product. A bid is stored for the financial product from the second client in the database, if it can be shown that second client has obtained the due diligence information.

Embodiments of this aspect can include the following. In one embodiment, the due diligence information comprises an electronic representation of a physical due diligence document, such as an electronic image substantially replicating the physical due diligence document. In one embodiment, the second client can request information relating to the financial product, including the due diligence information. In one embodiment, the second client can be provided with a list of financial products offered for sale, and in one embodiment the second client can search for financial products offered for sale that meet a condition, such as a condition specified by the second client. In at least one embodiment, the second client can place a bid on the financial product, and in at least one embodiment the bid can be accepted on behalf of the seller.

In at least one embodiment, the above method further includes the step of computing a price for the financial product. The price is based at least in part on at least one of the following: market information (which can, for example, include at least one indicator selected from the group consisting of U.S. Federal Funds rate, U.S. prime rate, bond rate, U.S. treasury bill rate, U.S. treasury bond rate, U.S. treasury note rate, S&P 500 index, Dow Jones Industrial Average, and NASDAQ Combined Composite Index.), seller information, due diligence information, and trade history information (which can, for example relate to at least one bid for a financial product that was accepted.)

In another aspect, at least one embodiment of the invention provides a computerized exchange for trading financial products, wherein the exchange is accessible using a computer network, comprising a server, a pricing engine, and a database. The server is in operable communication with a client and is programmed for receiving requests from a client to price a financial product offered for sale. The pricing engine is in communication with the server and computes a price for the financial product offered for sale, the price based at least in part on at least one of the following: market information, information that the seller has provided about the financial product; information that the client provides about the financial product, due diligence information, and trade history information. The database stores information relating to the least one financial product offered for sale and the computed price for that financial product.

In another aspect, in at least one embodiment, the invention comprises a computerized system for trading financial products, comprising means for receiving information about at least one financial product for sale, the information including due diligence information capable of fulfilling at least a portion of a request for due diligence on the financial product; means for computing a price on the financial product, the price based at least in part on at least one of the following: market information, information received about the financial product, due diligence information, and trade history information; means for providing a potential bidder on the financial product with the due diligence information and a price for the financial product; and means for storing a bid on the financial product if the bidder has received the due diligence information on the financial product.

The foregoing and other objects, aspects, features, and advantages of the invention will become more apparent from the following description and from the appendices.

BRIEF DESCRIPTION OF THE FIGURES

The advantages and aspects of the present invention will be more fully understood in conjunction with the following detailed description and accompanying drawings, wherein:

FIGS. 5A through 5D are representative screen shots illustrating a form for sellers to list a financial product, in accordance with an embodiment of the invention;

FIG. 7 is a representative screen shot illustrating an input form used to search for a financial product, in accordance with an embodiment of the invention;

FIG. 10 is another representative screen shot illustrating the financial product information provided to a user, in accordance with an embodiment of the invention;

FIG. 11 is a representative screen show illustrating financial product summary information provided to a user, in accordance with an embodiment of the invention;

FIG. 12 is a representative screen show illustrating financial product statistical information provided to a user, in accordance with an embodiment of the invention;

FIG. 13 is a representative screen show illustrating financial product information provided to a user, in accordance with an embodiment of the invention;

FIG. 14 is a representative screen shot showing an example of a portion of the mortgage note documentation available to a user, in accordance with an embodiment of the invention;

FIG. 15 is a representative screen shot showing an example of a portion of the title insurance documentation available to a user, in accordance with an embodiment of the invention;

FIG. 20 is a representative screen shot illustrating a form for pricing a financial product, in accordance with an embodiment of the invention;

FIG. 21 is a representative screen shot illustrating a form for performing a computation on a financial product, in accordance with an embodiment of the invention;

FIG. 22 is a representative screen shot illustrating the results of the computation requested in the screen shot of FIG. 21, in accordance with an embodiment of the invention;

FIG. 24 is a representative screen shot illustrating a form for performing a foreclosure computation on a financial product, in accordance with an embodiment of the invention;

FIG. 25 is a representative screen shot illustrating the results of the computation requested in the screen shot of FIG. 23, in accordance with an embodiment of the invention;

FIG. 26 is a representative screen shot illustrating a form for performing an extension/restructure computation on a financial product, in accordance with an embodiment of the invention;

FIG. 27 is a representative screen shot illustrating the results of the computation requested in the screen shot of FIG. 25, in accordance with an embodiment of the invention;

FIG. 28 is a representative screen shot illustrating a form for performing a DPO/Early Payoff computation on a financial product, in accordance with an embodiment of the invention;

FIG. 29 is a representative screen shot illustrating the results of the computation requested in the screen shot of FIG. 27, in accordance with an embodiment of the invention.

The drawings are not necessarily to scale, emphasis instead generally being placed upon illustrating the principles of the invention.

DETAILED DESCRIPTION

As used herein, the Internet refers at least to a collection of networks and gateways that use the transmission control protocol/Internet protocol (TCP/IP) suite of protocols to communicate with one another. The World Wide Web (WWW) refers at least to a set of inter-linked hypertext documents residing on hypertext transport protocol (HTTP) servers. As used herein, the WWW also refers at least to documents accessed on secure servers, such as HTTP servers (HTTPS), which provide for encryption and transmission through a secure port. WWW documents, which may be referred to herein as web pages, can, for example, be written in hypertext markup language (HTML). As used herein, the term "web site" refers at least to one or more HTML documents and associated files, scripts, and databases that may be presented by an HTTP or HTTPS server on the WWW. The term "web browser" refers at least to software that lets a user view HTML documents and access files and software related to those documents.

Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. An example of a general-purpose computer system 10 usable with at least one embodiment of the present invention is illustrated in FIG. 1.

Figure 1:
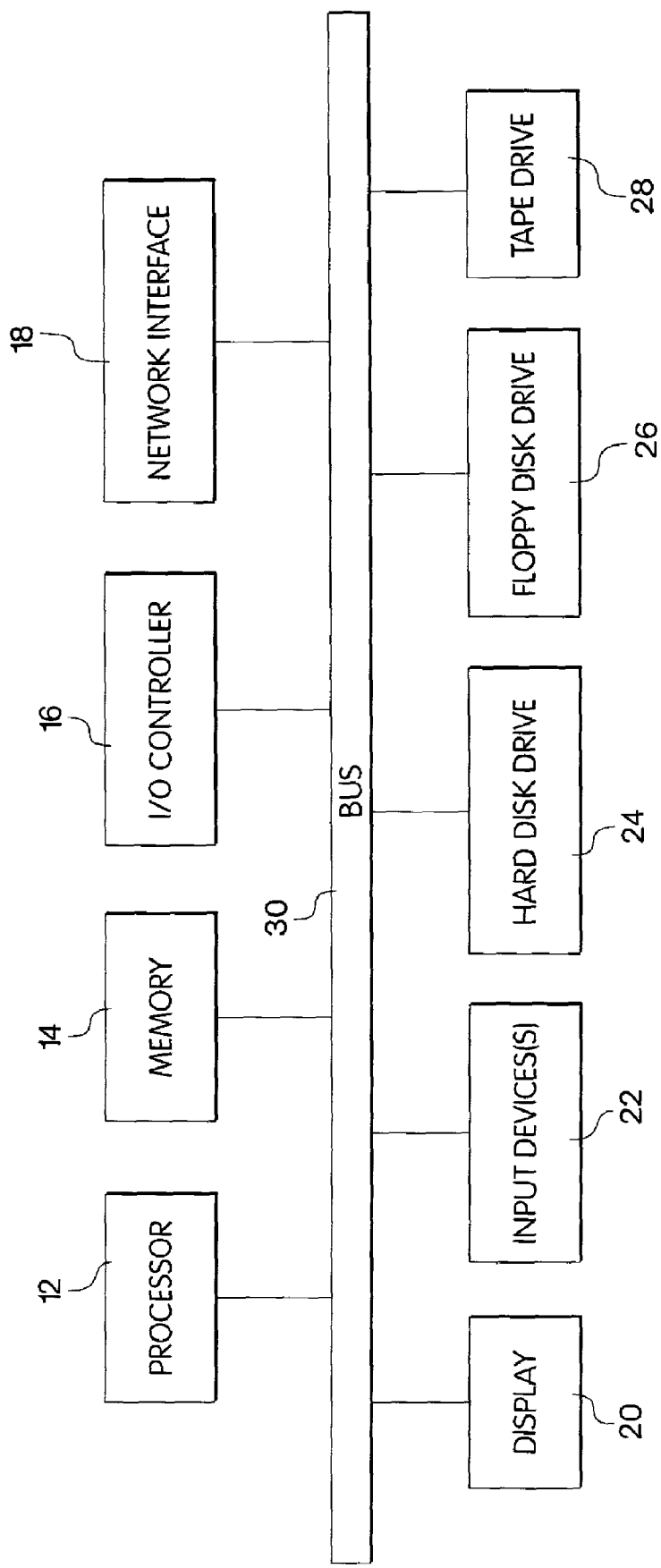
FIG. 1 is an illustration of a computer system in which at least one embodiment of the present invention can be embodied.

Referring briefly to FIG. 1, the general purpose computer system 10 includes a central processor 12, a main memory unit 14 for storing programs and/or data, an input/output controller 16, a network interface 18, a display device 20, one or more input devices 22, a fixed or hard disk drive unit 24, a floppy disk drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the computer system 10 to connect to a computer network such as the Internet.

Those skilled in the art will appreciate that computer systems embodying the present invention need not include every element shown in FIG. 1, and that equivalents to each of the elements are intended to be included within the spirit and scope of the invention. For example, the computer system 10 need not include the tape drive 28, and may include other types of drives, such as compact disk read-only memory (CD-ROM) drives. CD-ROM drives can, for example, be used to store some or all of the databases described herein.

In at least one embodiment of the invention, one or more computer programs define the operational capabilities of the computer system 10. These programs can be loaded into the computer system 10 in many ways, such as via the hard disk drive 24, the floppy disk drive 26, the tape drive 28, or the network interface 18. Alternatively, the programs can reside in a permanent memory portion (e.g., a read-only-memory (ROM)) chip) of the main memory 14. In another embodiment, the computer system 9 can include specially designed, dedicated, hard-wired electronic circuits that perform all functions described herein without the need for instructions from computer programs.

In at least one embodiment of the present invention, the computer system 10 is part of a client-server system, in which a client sends requests to a server and a server responds to requests from a client. That is, the computer system 10 can be either a client system or a server system. In one embodiment, the invention is implemented at the server side and receives and responds to requests from a client, such as a reader application running on a user computer.

The client can be any entity, such as a the computer system 10, or specific components thereof (e.g., terminal, personal computer, mainframe computer, workstation, handheld device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC.RTM., PENTIUM-based, or RISC-based, that includes an operating system such as IBM.RTM, LINUX, OS/2.RTM. or MICROSOFT WINDOWS (made by Microsoft Corporation of Redmond, Washington) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (e.g., a PDA), an Internet appliance, a telephone, an electronic reader device, or any other such device connectable to the computer network.

The server can be any entity, such as the computer system 10, a computer platform, an adjunct to a computer or platform, or any component thereof, such as a program that can respond to requests from a client. Of course, a "client" can be broadly construed to mean one who requests or gets the file, and "server" can be broadly construed to be the entity that downloads the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

Embodiments of the invention can be implemented using computer technologies such as software applications, computer-readable program media, data structures, carrier wave signals, user interfaces, and application program interfaces. For example, software embodying the present invention, in one embodiment, resides in at least one application running on the computer system 10. In at least one embodiment, the present invention is embodied in a computer-readable program medium usable with the computer system 10. In at least one embodiment, the present invention is embodied in a data structure stored on a computer or a computer-readable program medium. In addition, in one embodiment, the present invention is embodied in a transmission medium, such as one or more carrier wave signals transmitted between the computer system 10 and another entity, such as another computer system, a server, a wireless network, etc. The present invention also, in an embodiment, is embodied in an application programming interface (API) or a user interface. In addition, the present invention, in one embodiment, is embodied in a data structure.

In at least one embodiment, the invention provides a system that enables interaction between a number of parties that can participate in transactions involving financial products, such as debt transactions. In accordance with at least one embodiment of the invention, analysts, buyers and sellers of debt, and other interested parties can access a computerized system via a website or portal, over a computer network to access a variety of debt related features and functions. At least some embodiments of the invention provide features and functions whereby potential buyers can search for, view information about, obtain documentation for, originate, and bid on, financial products, such as commercial loans, offered for sale by sellers. In addition, at least some embodiments of the invention provide features and functions whereby potential sellers can upload information about, list, compute a price for, provide documentation for, originate, and accept bids on financial products, such as commercial loans. Further, at least some embodiments of the invention permit users, including buyers, sellers, and entities that are neither buyers nor sellers, to search for, price, and obtain information about financial products for sale.

Throughout the following description, the terms "buyer" and "bidder" are used interchangeably, although it should be understood that at least some embodiments of the invention, as described herein, the "buyer" is the "bidder" that wins the bidding process.

Figure 2:
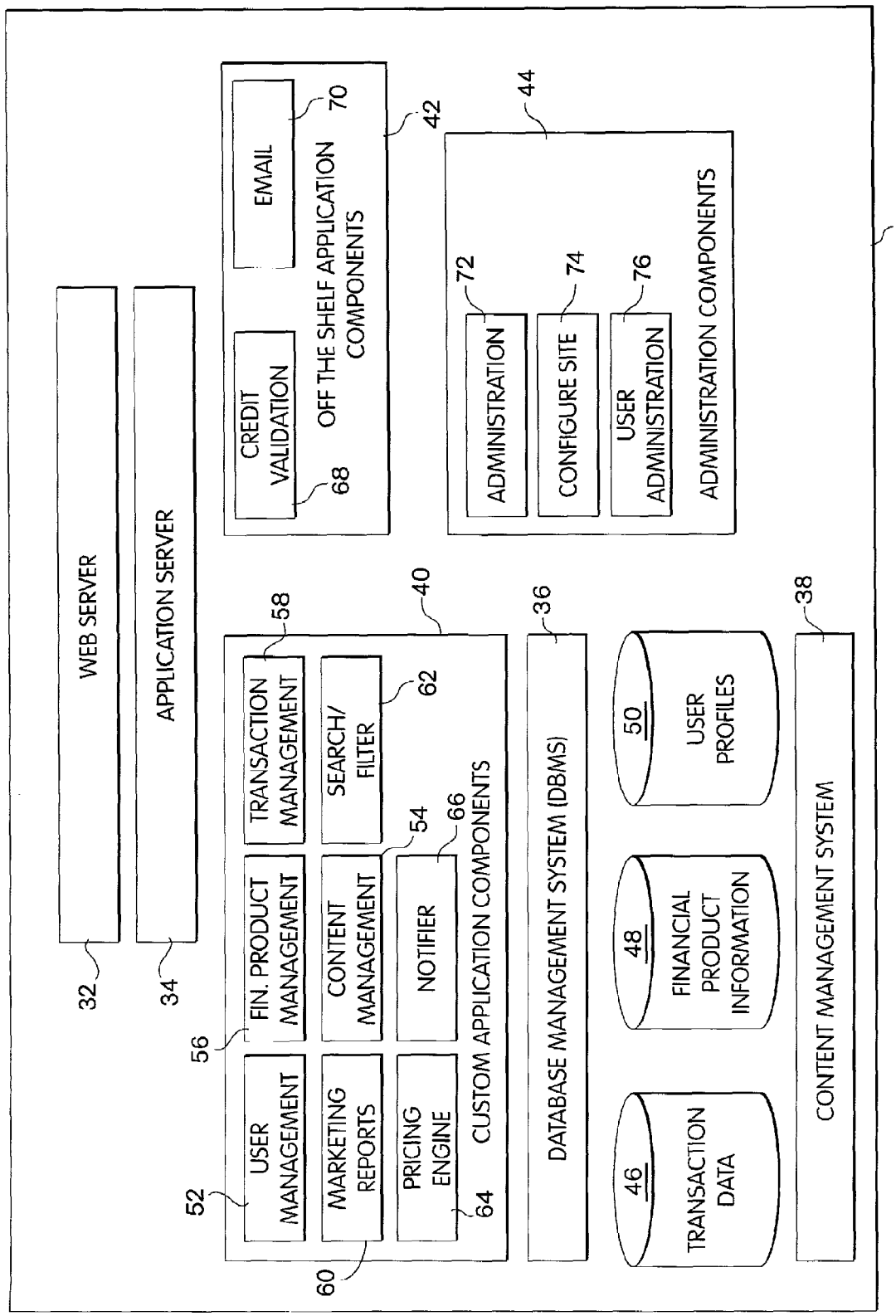
FIG. 2 is a block diagram giving an architectural overview in accordance with one embodiment of the invention.

FIG. 2 is a block diagram giving an architectural overview of a system 30 implemented in accordance with one embodiment of the invention. The system 30 of FIG. 2 is made available, in at least one embodiment, through a web site accessible to users of a global information network such as the Internet. The system 30, in one embodiment, includes a set of infrastructure components (Web Server 32, Application Server 34, database management system (DBMS) 36, and Content Management System 38), Application Components, including Custom Application Components 40 and Off-The-Shelf Application Components 42, Administration Components 44 and Database Components including Transaction Data 46, Financial Product Information 48, and User Profiles 50. Each component or subsystem of the system 30 can be in operable communication with at least one other component of the system 30, as necessary.

In one embodiment of the invention, the Web Server 32 includes the Microsoft Internet Information Server (IIS), manufactured by Microsoft Corporation, Redmond, Washington. The server software for the Microsoft IIS uses HTTP to deliver WWW documents, incorporates various functions for security, permits common gateway interface (CGI) programs, and provides for Gopher and file transfer protocol (FTP) services. However, those skilled in the art will recognize that other types of web server software may be used for the Web Server 10 in accordance with the invention.

The Application Server 34, in at least one embodiment, includes Microsoft Active Server Pages (ASP), which enable server side scripting (versus client-side scripting). An ASP can, for example, contain code written in visual basic script (VB Script) or JavaScript (Jscript). The Application Server 20 can also comprise other types of application server programs such as Unix-based CGI scripts.

The DBMS 36, in one embodiment, is achieved using the Microsoft structured query language (SQL) system, but other DBMS systems, such as those manufactured by Oracle and Sybase, are of course usable in accordance with the invention. The content pages of the Content Management System 38, in one embodiment, include a plurality of content pages, such as content pages displaying financial product information, due diligence documents, and third party information. Examples of some of these content pages are provided herein. In one embodiment, the content pages include HTML templates and pages for dynamic and static content pages, a splash page, pages for each of the site divisions (e.g., consumer home page and related pages, service provider home page and related pages), link pages, and general content pages. This list of content pages is not limiting; those skilled in the art will of course recognize that many other types of content pages can be provided in accordance with the invention.

Referring again to FIG. 2, the Custom Application Components 40, includes components developed to accomplish some of the functions of the system 30 described herein. In at least one embodiment, the Custom Application Components 40 includes components such as User Management 52, Content Management 54, Financial Product Management 56, Transaction Management 58, Marketing Reports 60, Search/Filter 62, Pricing Engine Pricing Engine 64, and a Notifier 66.

User Management 40 is a subsystem providing user management functions for users of the system 30. These users, in at least one embodiment, can be sellers and potential sellers of financial products, buyers and potential buyers of financial products, so-called market observers (users who can view the transactions occurring on the site and/or the financial products available on the site, but who are not necessarily participating in any transactions), visitors, "guest" users, auditing personnel, etc. For example, in at least one embodiment, the User Management 40 subsystem provides interface to data such as user profile data, user preference data, stored search/filter results, lists of financial products for which a user has purchased due diligence or other information, a user registration component to handle initial site registration, login/authentication functions, an interface that allows a system administrator or quality control person to "activate" the ability for a Buyer or Seller to conduct transactions, and the like.

Content Management 54 is a subsystem providing interface to the Content Management System (CMS) 38 that allows for the management of all of the content related to financial products listed with the system 30. Content Management 54, in at least one embodiment, includes a dynamic data-driven user content display component to handle access to and display of the site content based on the type of user (buyer, Seller, Quality Control Rep, Admin, etc.). In addition, Content Management 54, in one embodiment, includes an interface permitting the management and download of templates used by Sellers to prepare the documentation for financial products they want to sell, along with the ability to upload this information to the site. Examples of this interface are provided herein.

Financial Product Management 56 is a Subsystem for allowing a Seller to specify a financial product (e.g., loan, security, certificate of deposit, mutual fund, etc.), a Buyer to specify the type of financial product she is interested in buying, and the function to match Buyers to Sellers based on the criteria specified by each. Financial Product Management 56, in at least one embodiment, includes screens and forms used to collect information about the financial product from the Seller. For example, Financial Product Management 56 can include features such as financial product summaries, detailed financial product information (such as pictures, maps, text and spreadsheets), which can be provided by the Seller, a third party, and/or the administrator of the system 30, and financial product pricing. In addition, Financial Product Management 56, in one embodiment, includes all screens and logic to display financial product information to potential Buyers. These features and functions are illustrated and described more fully herein.

Financial product pricing, in accordance with the invention, can be determined in a number of different ways, as will be described herein. For example, in at least one embodiment, the loan pricing is determined using the Pricing Engine subsystem 64, described more fully herein. In at least one embodiment, the financial product pricing is determined by an analyst (i.e., a person). In at least one embodiment, the financial product price is determined using a combination of information from both the Pricing Engine Pricing Engine 64 and the analyst. However, in at least one embodiment, the Pricing Engine Pricing Engine 64 is entirely automatic. Pricing Engine Pricing Engine 64.

In one embodiment of the invention, financial product information is provided in summary form to a prospective Buyer or other user. The summary form, in one embodiment, is generated automatically, using templates a user receives from information provided in forms filled out by a Seller. In at least one embodiment, the summary form of financial product information is created at least in part by an individual accessing the information. Buyers can obtain detailed information and/or materials (e.g., due diligence information, such as certificates of insurance, etc,) about a given financial product, as well. In at least one embodiment, a fee is charged for at least some of the detailed information about the financial product for sale. In addition, in one embodiment of the invention, Buyers cannot bid on or purchase a financial product for sale unless the system 30 has proof that the Buyer has at least been provided with the appropriate due diligence information. This feature, provided in at least one embodiment of the invention, can help to satisfy National Association of Securities Dealers (NASD) requirements. For example, in one embodiment, this proof is satisfied by a Buyer's purchasing the due diligence materials. Examples of these materials and this process are discussed in more detail herein.

In at least one embodiment, Financial Product Management 56 includes an interface permitting a Seller to upload financial product data and materials and request the generation of a detailed financial product summary for a specific financial product the Seller is offering for sale, so that potential buyers can have access to that information. As noted previously, the generation of the detailed financial product summary can be automated, accomplished by one or more persons, or a combination of the two. In at least one embodiment, selected individuals (called "Quality Control" representatives and managers) are assigned to manage and monitor one or more financial products associated with one or more Sellers, so in at least this embodiment, the Financial Product Management 56 includes screens and logic to allow a Quality Control Representative to view the list of financial products he/she is responsible for and for a Quality Control Manager to allocate and assign loans to Quality Control Representatives.

For example, a Quality Control Representative can assist a bidder with questions the bidder has about a financial product for sale, any information about or documentation for the financial product, the bidding process, or about the seller of the financial product. Quality Control Representatives, in one embodiment, have access to at least a portion of the Seller 102 and Buyer 100 information (including, for example, lists of financial products that a Buyer 100 has bid on, lists of documentation associated with a given financial product, etc.), and can monitor the bidding process for one or more financial products. Quality Control Managers, in one embodiment, have access to at least a portion of the Seller 102 and Buyer 100 information, as well, and further have access to and can monitor the actions of the Quality Control Representatives.

Transaction Management 58, in one embodiment, is a subsystem that provides for the handling and tracking of financial product transactions, such as between Buyers and Sellers. Transaction Management 58 includes substantially all screens and logic to allow a Buyer to bid on or to buy a specific financial product offered by a Seller and can allow the Seller to accept or reject a specific bid from a Buyer. In at least one embodiment, Transaction Management 58 includes logic and/or rules that permit the system 30 to take action on behalf of a Buyer or a Seller. For example, Transaction Management 58 can include logic whereby it is authorized to accept a bid from a Buyer on behalf of a Seller if a specified condition (e.g., price) is met. In a similar example, Transaction Management 58 can include logic whereby it is authorized to place bids for a financial product on behalf of a Buyer, in accordance with one or more conditions.

In one embodiment, Transaction Management 58 includes logic to implement one or more types of auctions of a financial product offered for sale, including sealed-bid format and "English" auction format. In one embodiment, the sealed bid format presents the bidder (also referred to herein as the Buyer) with a form to enter the bid and provide any contingencies to the bid (e.g., "This bid is valid if the seller can substantiate that the borrower is willing to close on Sep. 19, 2001"). In the English auction format, bids are accepted without contingencies.

In one embodiment, Transaction Management 58 can also include the logic and screens required to allow Buyers and Sellers to close the transaction (either by completing it or aborting it) using the system 30. In at least one embodiment, however, closing the transaction is accomplished outside of the system 30.

Referring again to FIG. 2, Marketing Reports 60 includes logic and forms to interface with tools such as Crystal Reports (available from Crystal Decisions, Inc. of Palo Alto, Calif.) and the like to generate "AdHoc" Marketing Reports. In one embodiment, the Marketing Reports 60 includes design and implementation within Crystal Reports or similar tool of approximately 12 standard Marketing Reports.

The Search/Filter subsystem 62 is a component that matches user-provided search criteria with Seller—provided financial product information previously uploaded to the system 30. In one embodiment, searches (also referred to herein as a financial product "filter," e.g., "loan filter") are filtered by one or more criteria. For example, the Search/Filter subsystem 62 of one embodiment can filter searches by criteria such as Geographic Location, Loan Type, Loan Amount, Interest Rate Range, Maturity Status, Loan Quality (four subcategories), and/or other criteria, as those skilled in the art will appreciate. Examples of searches and filtering in accordance with an embodiment of the invention are provided herein. In one embodiment, the Search/Filter subsystem 62 includes substantially all forms and logic to perform the search function and present the information back to the user (e.g., a Buyer) conducting the search.

The Pricing Engine Pricing Engine 64 is a subsystem that computes a price for the loan. In at least one embodiment, the Pricing Engine 64 uses loan data received from the Seller, information (such as the current prime interest rate) obtained from third parties, historical financial product trade information, and/or information provided by an Analyst to generate data that is used to compute a price for the loan. For example, in one embodiment, such data is provided to a spreadsheet program, such as MICROSOFT EXCEL (available from Microsoft Corporation of Redmond, Washington), to price the loan. The resulting calculations are stored in the Financial Product Information database 48 and thereby made available to the Buyers, the Seller, Analysts or Quality Control Reps.

The Pricing Engine Pricing Engine 64, in one embodiment, includes substantially all screens and logic to allow a user to specify the loan to "price". In one embodiment, the Pricing Engine Pricing Engine 64 also bases its computations on additional loan pricing parameters, such as those provided by a Seller or an Analyst. In one embodiment, the Pricing Engine Pricing Engine 64 includes a "back-end" process that runs an instance of MICROSOFT EXCEL using the loan data, captures the MICROSOFT EXCEL output, and stores the information in the Financial Product Information database 48. Examples of the operation of the Pricing Engine Pricing Engine 64, in accordance with an embodiment of the invention, are provided herein. The Pricing Engine Pricing Engine 64, in one embodiment, includes logic to generate notifications to parties (e.g., Buyers, Sellers, etc.) to a transaction or potential transaction.

In at least one embodiment, the Pricing Engine 64 can provide a substantially "quick" estimate of the value of a financial product. This feature is referred to in the example embodiment shown herein as "Quick Price". The price estimate is based at least in part on one or more assumptions, such as that a given financial product will perform according to its stated terms. This feature is explained more fully herein.

In one embodiment, a Notifier subsystem 66 generates these and other notifications. For example, Sellers can be notified, such as by a telephone call, letter, electronic mail message ("email"), facsimile ("fax"), automated message, or other appropriate notification, whenever a Buyer has expressed interest in a financial product that the Seller 102 is selling, such as when a Buyer 100 has ordered due diligence materials relating to a financial product that the Seller 102 is selling. In another example, a Buyer 100 who has viewed a financial product and/or ordered information about a financial product can be notified as to the closing date for bids on a given financial product. In still another example, a Buyer 100 who has bid on a financial product can receive notifications as to who has "won" or "lost" the bidding process.

Referring again to FIG. 2, the Off-the-Shelf Application Components 42 can include virtually any type of application component, including those regularly used in electronic commerce web sites, such as Credit Validation 68 and E-Mail 70. Credit Validation 68, on one embodiment, is an interface to an off-the-shelf credit card validation system used to handle the acceptance of payment for information about financial products, such as detailed financial product summaries, due diligence information, and other information provided to a Buyer or potential Buyer. Credit Validation 68, in one embodiment, includes substantially all forms and logic to allow the Buyer to initiate the interaction with the Credit Validation 68 to authorize the purchase, such as via a credit card or other suitable payment mechanism In accordance with one embodiment of the invention, E-Mail 70 is an "Off-the-shelf" component (such as MICROSOFT OUTLOOK) used to allow a Buyer, Seller, or other entity to receive alerts from the system when events impacting a financial product occur. For example, a Buyer can receive notification when new due diligence materials become available, when a condition to the loan (e.g., term) has changed, when a bid higher than the Buyer's bid has been submitted, etc. E-Mail 70, in one embodiment, includes logic that detects these events and includes software to generate the e-mail using the commercial e-mail package.

The Administration Components 44 of at least one embodiment of the invention include Administration 72, Configure Site 74, and User Administration 76. Administration 72 is the administration tools used with the system 30. For example, in one embodiment the administration tools are the standard administrative tools provided with the Web Server 32, Application Server 34, DBMS 36, and Off-the-Shelf Components 42. In another embodiment, depending on the final reporting requirements, Administration Components 44 include tools such as third party site monitoring or usage analysis/reporting tools.

Configure Site 74 is, in one embodiment, a site configuration component. This is a set of tools to enable an entity such as a Site Administrator to configure the web site associated with the system 30. Depending on specific requirements, these tools can be developed as a web-based application or as a standalone client/server application.

User Administration 76 is, in one embodiment, a user administration component and includes a set of tools to enable an entity such as a Site Administrator to administer users. User Administration 76 provides add, delete, and modify functions. Depending on specific requirements, User Administration 76 can, for example, be a web-based application or as a standalone client/server application.

The components of the database for the system 30, in accordance with one embodiment of the invention, include databases for Transaction Data 44, Financial Product Information 48, and User Profiles 50. Transaction Data 44 contains information used to track all transactions that occur on the site between Buyers and Sellers of financial products. Transaction Data 44 allows entities such as Quality Control personnel to obtain transaction history of any financial product offered for sale in connection with the system 30. As will be explained herein, the transaction history is, in one embodiment, used to help compute a price for a financial product.

Financial Product Information 48 is a database containing information on each financial product submitted to the site and, in at least one embodiment, includes links to all associated supporting materials for a given financial product (e.g., due diligence materials, summary information, related third party information such as maps, demographic profiles, and the like).

User Profiles 50 is a database containing user profile information. In at least one embodiment, User Profiles 50 stores "site-wide" user attributes such as username/password, Buyer preferences, Seller preferences, payment information, etc. This information may vary depending on the type of user (e.g., Buyer vs. Seller vs. Quality Control, etc.).

In one embodiment, the configuration of FIG. 2 is implemented using at least two web servers, two application servers, and two database servers. In this embodiment, this configuration can be used regardless of whether NT or UNIX is used as the technology platform. This configuration has the ability to scale by adding additional web servers, application servers, database servers and bandwidth. Moreover, these technology platforms have the ability to scale by adding additional processors, memory and disk space. In addition, in another embodiment, the database is segmentable and scaleable.

In yet another embodiment, the invention is implemented with fault tolerant features. For example, failure of the web servers and application servers of the system 30 are covered by complete machine redundancy (each of the initial machines is identical) coupled with an appropriate load balanced solution (such as the LOCAL DIRECTOR available from Cisco Systems of San Jose, Calif.).

In another example, failure of the database servers of the system 30 is covered by use of reliable components with built in redundancy (power supplies, CPUs, memory) as well as complete machine redundancy. In still another example, using a redundant array of independent disks (RAID) for the database and disk mirroring for the Web servers covers disk failure.

In still another embodiment, the system of the invention is hosted at an appropriate data center (such as Exodus, NaviSite, PSINet, and the like) with firewall services, load balancing services, burstable bandwidth, room for growth and appropriate network/infrastructure redundancy.

Figure 3:
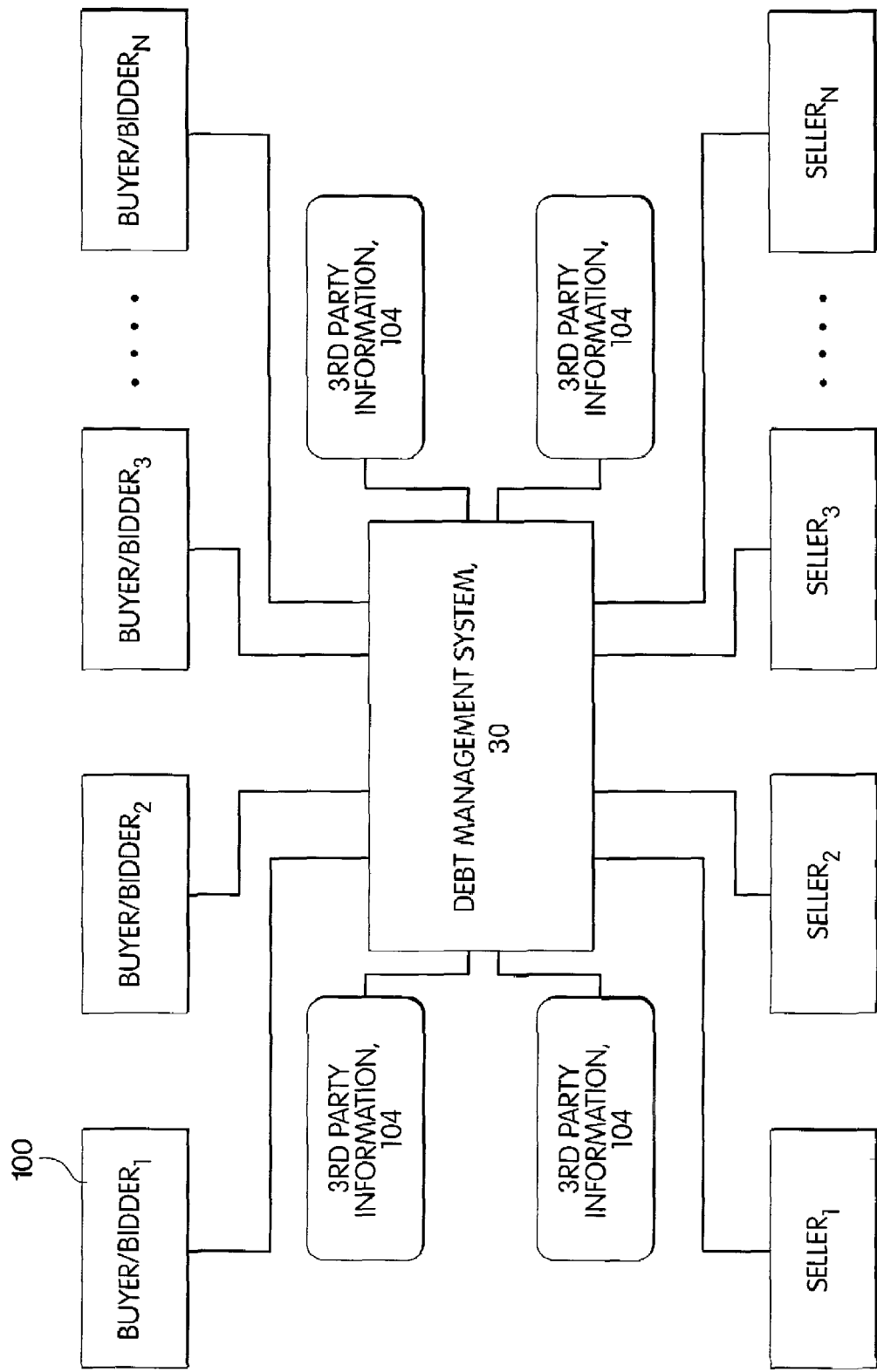
FIG. 3 is a block diagram providing an overview of the interaction of the system of an embodiment of the invention with buyers, sellers, and third parties.

FIG. 3 is a block diagram providing a perspective of how the system 30 of an embodiment of the invention fits into an environment of buyer/bidders 100, sellers 102, and third parties 104. The buyer/bidders 100 (referred to herein interchangeably as "buyers" and "bidders") are entities, such as individuals or organizations, which want to buy or bid on a financial product.

In accordance with one embodiment of the invention, a Buyer 100 is an entity, such as a person, organization, or other user of the system 30, who is interested in getting information about (and possibly purchasing) a financial product, such as a loan, offered for sale by another. A Buyer can bid on financial products available for sale by Sellers 102. In one embodiment, the category of Buyers 100 includes both those entities that have registered with the system 30 ("registered Buyers") and those who have not ("Guests"). In one embodiment of the invention, Guests have limited ability to access the information that is available to registered Buyers. Also, FIG. 3 illustrates, the system 30 is capable of interacting with any number of buyer/bidders 100 and sellers 102. Although only four third parties 104 are illustrated in FIG. 3, any number of third parties 104 can interact with the system.

In accordance with one embodiment of the invention, a Seller 102 is an entity, such as a person or organization, offering one or more financial products, such as loans, for sale. A Seller 102 also can be an entity, such as a broker or agent, authorized to act on behalf of another entity selling a financial product.

A third party 104 is, in accordance with one embodiment of the invention, an entity, such as a person or organization, providing information to the system 30 that is usable and/or useful during a financial product transaction. Some of this information can, for example, include "background" information of interest to a Buyer 100, such as statements and documents from insurance companies insuring a Seller 102, demographic organizations providing information about a physical location associated with a given financial product, etc. Third parties 104 also can include suppliers of information used to price financial products, such as financial websites providing information such as Federal Money Funds rates. Those skilled in the art will recognize that, depending on the financial product involved, many different types of third parties can provide information that can be of use in a transaction involving the financial product.

Other parties and entities (not shown in FIG. 3) that can interact with the system 30 include Analysts, Marketing personnel, Quality Control Personnel, and Site Administrators.

An Analyst is an entity that, in at least one embodiment, computes prices for financial products for sale by Sellers based on factors that can include the profile of the loan, historical information, and external information. In one embodiment of the invention, the Analyst also can use a "black box" pricing calculator, such as one provided by another third party, or even the Pricing Engine Pricing Engine 64 of FIG. 2. In at least one embodiment, the invention does not necessarily use an analyst and instead automatically computes prices for a financial product. This feature is described more fully herein.

Marketing is, in one embodiment, an internal user associated with the administrator/owner of the system 30 and/or its associated website. This party can monitor Buyer/Seller activity and interests with an existing contact management system, such as ACT!, which is available from Internet Commerce Corporation of Scottsdale, Ariz.

Quality Control Personnel, in one embodiment of the invention, includes Quality Control Representatives and Quality Control Managers. The Quality Control Representative is an internal user associated with the administrator/owner of the system 30, who can, if necessary, facilitate the relationship between Buyers 100 and Sellers 102. This facilitation can, in one embodiment, include contacting the parties to resolve questions and disputes either may have. The Quality Control Manager is an entity, such a person, that can allocate loans among Quality Control Representatives.

In accordance with at least one embodiment of the invention, analysts, Buyers 100 and Sellers 102 of financial products, and other interested parties can access the system 30 via a website or a portal, over a computer network to access a variety of financial product related features and functions. For example, in the case of a loan for sale, a Buyer 100 can view a Loan Summary page (described more fully below) to view summaries of available loans and to get news related to loans, both specifically and generally. The Buyer 100 can also search for loans using one or more criteria.

Table 1 describes at least some of the types of features and services provided by a system implemented in accordance with one embodiment of the invention. In the example of Table 1, the feature or function is shown along with the parties that can use the feature or function. These features and functions can, for example, be implemented as functions accessible to a user via "buttons", pull-down menus, links, and the like, provided on a web page. Many of these features and functions are illustrated and described in greater detail herein.

It should be understood, however, that Table 1 is not intended to limit the scope of the types financial product-related functions and features provided in accordance with the invention. Those skilled in the art will recognize that the features and functions of Table 1 are merely representative of the types of features and functions that can be provided and that many other features and functions will occur to those skilled in the art. In addition, those skilled in the art recognize that, in some embodiments, a given feature or function may not be accessible to a given type of user, or may be accessible to more or different users than listed.

TABLE 1

Services Offered in one embodiment of the invention

| Actor | Feature | Description/Action |
|---|---|---|
| Buyer | Financial product Summary Page | View financial product summaries. Get general financial product-related News. |
| Buyer | Financial product Search | Search for financial product by: Geographic location, Financial product Type, Financial product Quality (four subcategories), Financial product Amount, interest rate, Maturity status, other dimensions as understood by those skilled in the art. The search criteria can be stored for each registered user and can become part of the profile. |
| Buyer | Price a Financial product | View financial product information within preset templates determined by business rules. Information presented can be filtered by profile and search criteria. |
| Buyer | Buyer Profile | Collect information such that manual buyer qualification process can be performed by personnel associated with the owner/administrator of the portal of the invention. |
| Buyer | Detailed Financial product | Views an overview of the information about a financial product he/she may be interested in purchasing. This information can be in the form of pictures, maps, text, and spreadsheets and can be available for view by a registered Buyer after the Buyer's payment is approved (for example, by credit card debit or payment plan confirmation). |
| Buyer | Detailed Documents | Views online detailed financial product documents, which may be in PDF-format or any other usable document format. In one embodiment, this information can be available in preview form (the first few pages of the detailed document) or in its entirety. |
| Buyer | Submit Bid | Allow a Buyer to submit all information required to bid on the specified financial product. |
| Buyer | Closure | Provide ability for Buyer to close the financial product by receiving an Invoice and Wiring and/or payment information. |
| Buyer | Alerts | Provide an alerting capability to send alerts to the Buyer when events impact his (potential) bid on financial products. For example, the alerts may include: a matching of Buyer criteria to an available financial product, updates in bid status, updates in financial product terms, Seller response (filtered by QC), existence of competing bids. |
| Seller | Request to Price a Financial product | Allows a Seller to create a financial product profile and enter criteria about the financial product for pricing by an Analyst. In one embodiment, this feature includes a calculator with counts (like that on Stock Xchange). |
| Seller | List a Price | Establish an intent to sell a financial product by establishing a price for the financial product and specifying a means of payment. |
| Seller | Seller Profile | Collect information such that personnel associated with the owner/administrator of the debt management system, website, or portal can perform a manual seller qualification. |
| Seller | Download Financial product Templates | Mechanism for Seller to download and standard financial product data templates that he can use to provide standard information about a financial product. In one embodiment, these templates can be templates associated with word processing and/or spreadsheet applications, such as Microsoft Word and Microsoft Excel templates. |

TABLE 1-continued

Services Offered in one embodiment of the invention

| Actor | Feature | Description/Action |
|---|---|---|
| Seller | Upload Financial product Data | Ability of a Seller to upload standard financial product information data in a predetermined format, such as PDF format. In one embodiment, the data uploaded to the site is in PDF format files built from Microsoft Word and Microsoft Excel templates downloaded from the site. For example, this data can be original Financial product data or updates to Financial product data (if the Seller resells the Financial product). One reason for providing this material is so that the system (and/or an Analyst) can assemble a Detailed Summary Document after a request to do so is received from the Seller. |
| Seller | Request Detailed Summary Document | Ability of a Seller to request an Analyst to create a Detailed Financial product Summary of the financial product the Seller is offering, so that it is available to potential Buyers. |
| Seller | Closure | Provide ability for Seller to close the financial product deal. |
| Seller | Alerts | Provide an alerting capability to send alerts to the Seller when events impact his financial product. In one embodiment, these alerts include: changes in valuation, confirmation of financial product pricing by the Analyst, queries from Buyers, Bids made (highest Bid information). |
| Analyst | Generate Detailed Summary Document | Generates a financial product's Detailed Summary Document at the request of a Seller and thereby makes the financial product available for sale to Buyers. |
| Analyst | Price Financial product | Calculates the price range of a financial product using the financial product profile provided by the Seller and a "black box" calculator associated with the owner/administrator of the web site. This process can be performed manually or automatically. |
| Marketing | Run Reports | Runs reports that compare the Buyer/Seller activity against the existing (ACT) contact management tool. |
| QC Rep | Qualify Seller | Use Seller-provided profile information and manual process to verify identity and billing information of a Seller. Perform an action on the site that "activates" a Seller who has previously registered on the site. |
| QC Rep | Qualify Buyer | Use Buyer-provided profile information and manual process to verify identity and billing information of a Buyer. Perform an action on the site that "activates" a Buyer who has previously registered on the site. |
| QC Rep | Financial product Queue | Simple-to-do list used to track the financial products the QC is responsible for. |
| QC Rep | Report | Report capability to monitor the status of financial products. |
| QC Rep | Overview Process | Capability to track and monitor detailed financial product status to moderate Buyer/Seller interaction. |
| QC Rep | QC Log | Ability to view the activity log for a given financial product in order to track dependencies and Buyer/Seller interaction. |
| QC Mgr. | Manage Financial product Assignments | Allocates and assigns financial products to Quality Control Reps and tracks their status. |
| Site Admin | Admin | Suite of administrative tools to enable site administrator to operate and monitor system. In one embodiment, includes basic site controls (e.g. start, stop, etc.), basic monitoring, usage reporting, etc. |
| Site Admin | User Admin | Add, delete, or modify User Profiles |

Although the examples for pricing, trading, analyzing, buying, and selling financial products described herein are provided using the example of a commercial loan, the example of loans is not limiting. As noted previously, the type of financial product for sale can be virtually any type of financial product, including commercial and residential loans, lines of credit, savings accounts, securities, bonds, insurance products, annuities, certificates of deposit, student loans, personal loans, and the like. The financial product can be a single product (e.g., a single loan) or a group of products (e.g., a group of loans, or a group of various types of financial products). Moreover, as described herein, at least some of the other types of actions provided by systems and methods of the present invention (such as pricing a financial product and bidding on a financial product) are similarly usable with at least some of these types of financial products.

Figure 4:
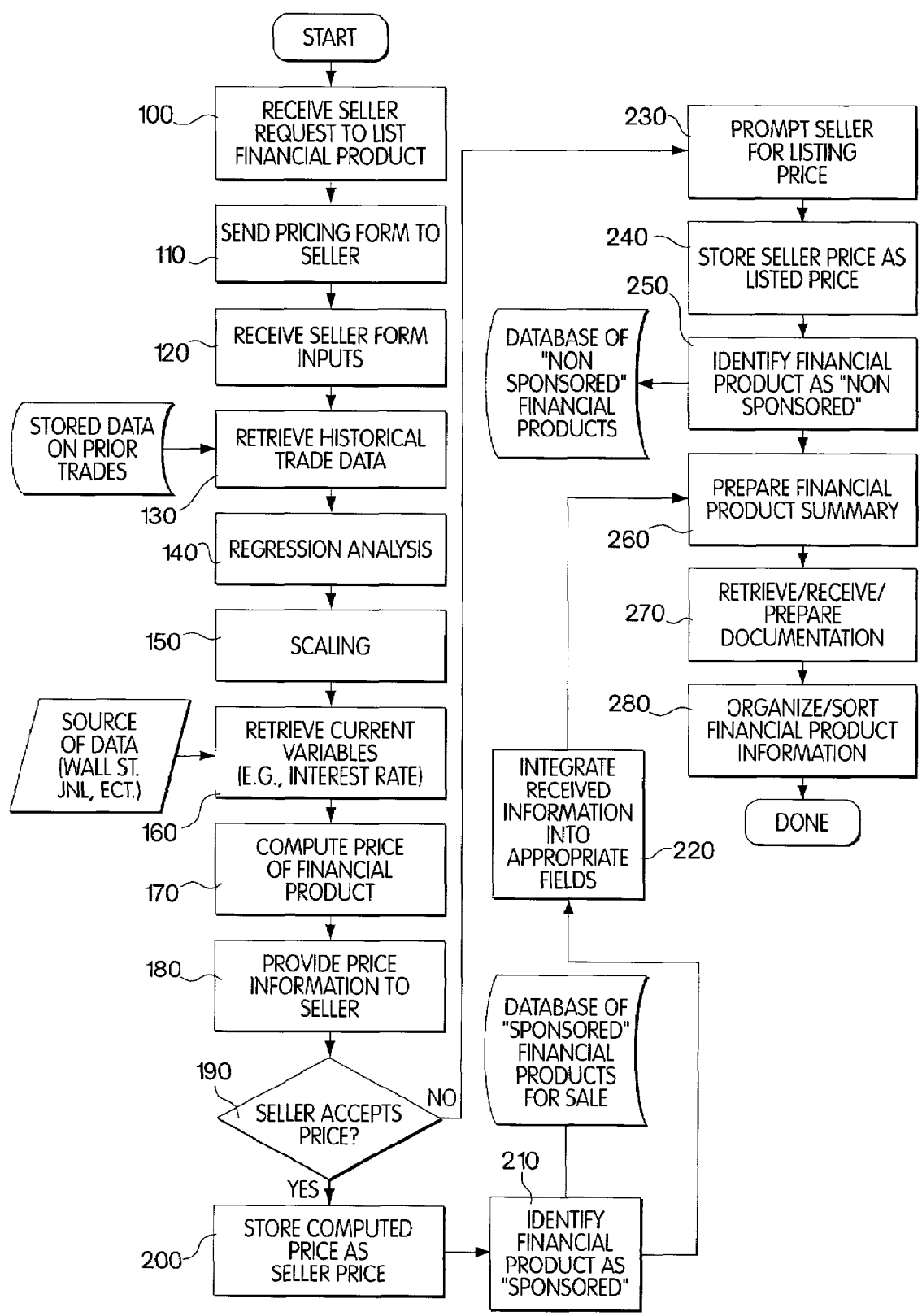
FIG. 4 is a flow chart illustrating a process for pricing financial product, in accordance with an embodiment of the invention.
Figure 5A:

FIG. 4 is a flow chart illustrating a process for pricing a financial product, in accordance with an embodiment of the invention. A Seller 102, for example, can use this process to determine a price for the financial product he is selling. Referring to FIGS. 2, 3 and 4, the process of FIG. 4 begins when the system 30 receives the request of a Seller 102 to list a financial product for sale (step 100). The Seller 102 can send the request to the system 30 by sending a message from a computer, such as a personal computer or workstation, over a computer network, to the system 30. In one embodiment, this is done by the Seller 102 going to a web page associated with the system 30, and accessing various functions on the web page using links, buttons, pull down menus, etc., located on the web page.

When the system 30 receives the request (step 100), it provides one or more forms to the Seller 102, such as pricing forms, so that the Seller 102 can provide the system 30 with some of the information needed to compute a price for the financial product. FIGS. 5A through 5D are representative screen shots illustrating forms 282, 284, 286, 288 that the system 30 provides to the Seller 102, in accordance with an embodiment of the invention. In one embodiment, the forms 282, 284, 286, 288 are constructed and arranged to automatically upload information that a Seller 102 has stored in another file, such as a spreadsheet file. In one embodiment, the system 30 stores a profile of the Seller 102, such that portions of the forms 282, 284, 286, 288 can be "filled out"

by the system in advance (e.g., "Seller's reference Number, Seller's name, etc.). The profile of a Seller 102, in one embodiment, also stores other information provided by a Seller 102, such as preferences, criteria for accepting bids, restrictions on bids (e.g., certain users may be prohibited from bidding), restrictions on access to information (bidders may be required to sign on and/or acknowledge specific conditions before receiving information), specification of type of bidding to occur (e.g., type of auction), permission for the system 30 to accept bids on behalf of the Seller 102, etc. This type of information also can be provided in the forms 282, 284, 286, 288.

Referring again to FIG. 4, after the system 30 sends the forms 282, 284, 286, 288 to the Seller 102 (step 110) and receives a response (step 120), the system 30 can compute a price for the financial product. In at least one embodiment, the Pricing Engine 64 uses data and characteristics about the financial product to compute the price for the financial product. The data and characteristics can include, but are limited to, parameters such as terms, time periods, conditions, locations, appraisals, discounts, liens, status, sponsors, servicing type, status, maturity, principal balance, financial product type, origination date, monthly payment, maturity date, interest rate, interest accrual method, and performance level.

As part of the price computation, the system 30 retrieves historical trade data (step 130) that it has stored relating to prior trades. For example, the system 30 can use Transaction Management 58 and query its Transaction Data database 46 (FIG. 2) to retrieve this data. This data helps the system 30 to analyze the relationship and similarity between the financial product being offered for sale and previous trades of financial products having one or more similar characteristics. For example, a Seller 102 may be listing a residential mortgage for a property with an outstanding loan balance of $310,000, an interest rate of 8.65%, a 30-year term, with an excellent payment history, which is located in a suburban community. The system 30 could then search for prior trades of other residential mortgages sharing some or all of these characteristics. The prior trade history could, for example, provide data such as cents on the dollar that the mortgage sold for on the secondary market and what factor(s) had the greatest impact on the price of the mortgage.

Based on the retrieved historical trade data, the system performs regression analysis (step 14) using both the historical trade data and the seller's inputs, to get an estimate for how at least a portion of the various characteristics of the financial product affects the price of the financial product. Based on the results of the regression analysis, the system 30 then assigns a scaling factor (step 150) to at least a portion of the characteristics (i.e., the various fields on the forms 282, 284, 286, 288). The system 30 also takes into account external variables (step 150), such as the U.S. Federal Funds rate, U.S. prime rate, bond rate, U.S. Treasury bill rate, U.S. Treasury bond rate, U.S. Treasury note rate, S&P 500 index, Dow Jones Industrial Average, and NASDAQ Combined Composite Index. The system 30 can be provided with external variables from virtually any known source of the information, including trade journals such as the WALL STREET JOURNAL, BLOOMBERG BUSINESS NEWS, etc. In one embodiment, the system 30 can automatically retrieve the information from a known location (such as on a computer network). In one embodiment, a user such as a system administrator also can provide the information to the system 30 via manual input.

Referring again to FIG. 4, the system 30 computes a price for the financial product (step 180) and provides the price to the Seller 102 (step 180). If the Seller 102 accepts the computed price (step 190), the system 30 stores the computed price as the selling price (step 200) of the financial product. In at least one embodiment, if the Seller 102 has accepted the computed price, the financial product is identified as a "sponsored" product (step 210) and is stored as such. "Sponsored," in one embodiment, indicates to potential Buyers 100 at least that the price of the financial product can be relied on as having the approval of the entity sponsoring the website of the system 30.

The price computed in FIG. 4 can, in one embodiment, provide a benchmark for a Seller 102 to determine what price is appropriate for the financial product it is selling, given current market conditions and historical trade data. Sellers 102 can revisit the process of FIG. 4 at any time and can get a price appropriate to the market conditions and trade history then in existence. This feature may help Sellers 102 recognize the true market value of their financial products.

If, however, the Seller 102 does not accept the computed price, the system 30 prompts the Seller 102 for its own price (step 230), which the system 30 receives and stores as the listed price for the financial product (step 240). In at least one embodiment, financial products having seller-provided prices are identified in such a manner that potential Buyers 100 can determine that the financial product is not "sponsored" (step 250). In at least one embodiment, such products are labeled as "direct events".

After the system 30 has a price for the financial product (whether the system 30 computes it or whether the Seller 102 provides it), the system 30 prepares a summary of the financial product based on the information it has about the financial product (step 260). In one embodiment, the summary is created by taking selected inputs from the forms 282, 284, 286, 288 and putting them into a predetermined template. In at least one embodiment, the financial product summary is created automatically by the system 30, without human intervention. In one embodiment, the summary is created in whole or in part by a person, such as an Analyst (as described previously) who reviews the information to create the financial product summary. Examples and illustrations of the loan summary are provided herein (see, for example, FIG. 11 which illustrates an example screen shot of a loan summary for an example loan for sale, in accordance with an embodiment of the invention.)

The system 30 also prepares a set of documentation on the financial product being offered for sale (step 280), so that potential Buyers 100 can view the documents and conduct any necessary due diligence. These documents include, for example, documents, such as those shown in Table 2 (which by way of example only shows documents used for a loan for sale):

TABLE 2

Documents provided for a Financial Product

| Document |
|---|
| 1: Table of Contents |
| 2: Narative |
| 3: Statistics |
| For Purchase |
| 4: Note |
| 5: Mortgage/Security Agreements |
| 6: Guaranty |
| 7: Assignments |
| 8: UCC |
| 9: Title Insurance |
| 10: Environ. Indemnity Agreement |

TABLE 2-continued

Documents provided for a Financial Product

Document

11: Property Condition Asses.
12: Appraisal
13: Environ. Site Assessment
14: Other Collateral Information
15: Other Sponsor Information Unlike known systems and web site that simply act as "bulletin boards," in at least one embodiment, the invention provides the unique ability to perform the entire due diligence process online. Buyers 100 and other investors are immediately able to review complete, original loan documentation and other critical information directly through the system 30 of the invention, eliminating the time and costs associated with traditional due diligence methods. In addition to immediate information access, the features and advantages of the some embodiments of the invention (including at least the "Quick Price", feature, the financial product computation tools, module, Forward Loan workflow tools, and automated email alerts that notify users when information on a selected financial product is updated,) as described herein, may facilitate the evaluation and workflow processes associated with trading financial products.

In one embodiment, the system 30 queries the Seller 102 for the necessary documents, which the Seller 102 can provide to the system in many different ways, including electronic transmission, physical mailing of the actual documents (in paper form, on diskette or CD-ROMs, etc). In at least one embodiment, the Seller 102 can upload some or all of the information, which can include standard financial product information data, to the system 30 in predetermined formats such as MICROSOFT WORD, MICROSOFT EXCEL, ADOBE ACROBAT, and the like. In at least one embodiment, the seller-provided information includes due diligence information that is capable of fulfilling at least a portion of a buyer's need for due diligence on the financial product. In at least one embodiment, the due diligence information comprises an electronic representation of a physical due diligence document, such as an electronic image substantially replicating the physical due diligence document. This is accomplished, in at least one embodiment, by using a document format such as PDF. In at least one embodiment, the due diligence information is scanned to create electronic image files representing the physical due diligence documents.

In one embodiment, the data uploaded to the site is in PDF format files built from Microsoft Word and Microsoft Excel templates downloaded from the system 30. For example, this data can be original financial product data or updates to financial product data (if the Seller 102 resells the financial product).

After the necessary documentation and financial product information is received, the system 30 organizes the information (step 280) for viewing and/or purchase by entities such as potential Buyers 100. In at least one embodiment, the system 30 uses a standardized format to organize the documents and/or the financial product summary, so that those accessing financial products have a consistent view and interface. The system 30 also can, if applicable, add links to information from third parties 104 that is of interest and/or relevant to the financial product offered for sale. Examples of these documents are provided and described herein (see, for example, FIGS. 9–17).

Figure 6:
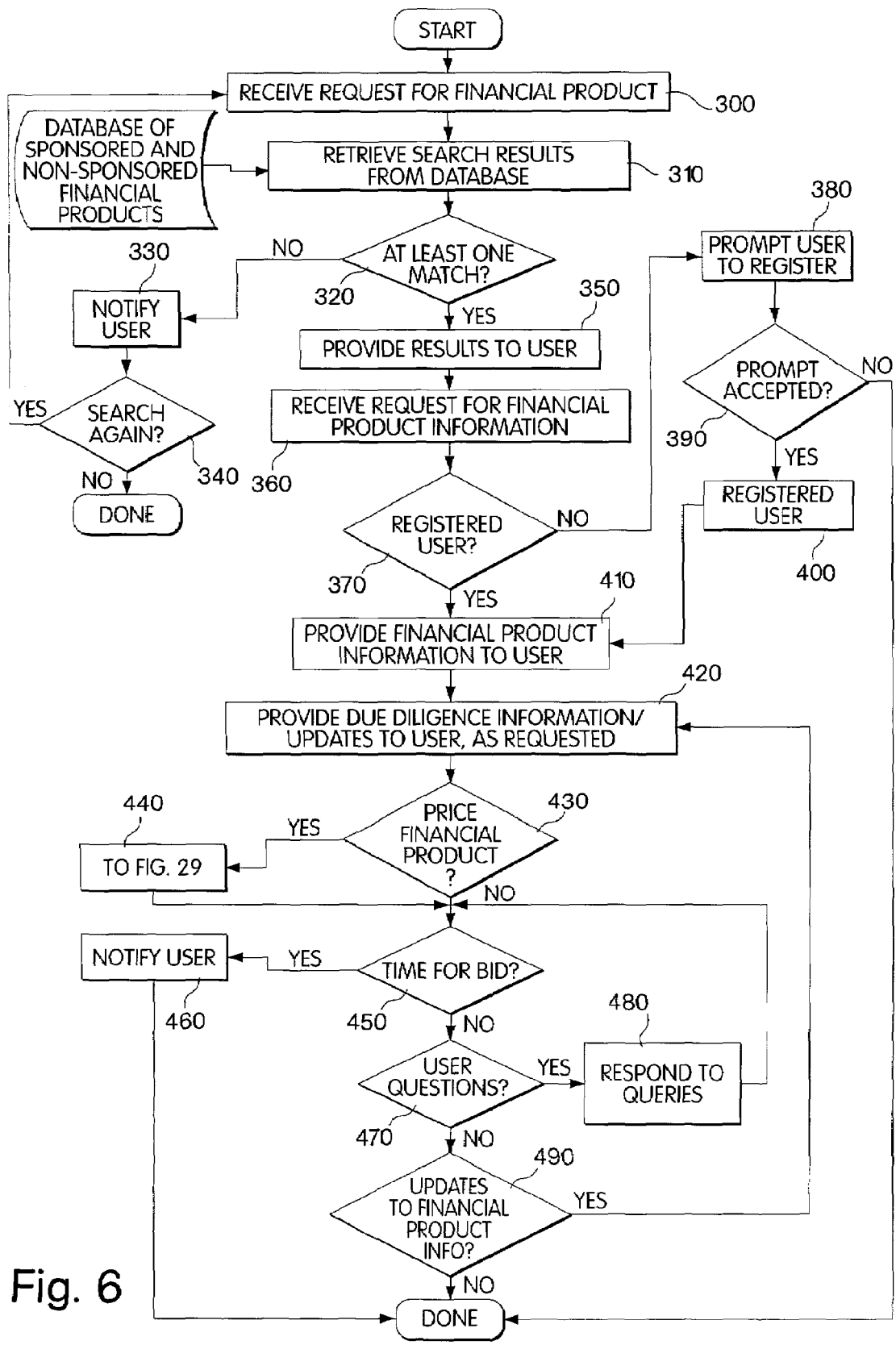
FIG. 6 is a flow chart illustrating a process for searching for a financial product, in accordance with an embodiment of the invention.

FIG. 6 is a flow chart illustrating a process for searching for a financial product, in accordance with an embodiment of the invention. Any user of the system 30, including Buyers 100, Sellers 102, third parties 104, visitors, and site administrators can conduct this search. The search can locate, for example, financial products listed with the system 30 using the process of FIG. 4.

Referring to FIGS. 2, 3, and 6, the system 30 receives a request from a user for a financial product (step 300). The request can be a request for all listed financial products or can be a request for financial products meeting one or more criteria. For example, in one embodiment, when a user accesses the system 30, if the user has a profile stored on the system 30, and the profile lists loan criteria, the system 30 can automatically bring up financial products meeting the stored criteria. Although not shown here, in one embodiment, a user may store the results of previous searches and bring those searches up, as part of step 300.

The request of step 300, in one embodiment, is in the form of a search form, presented, for example, as part of a graphical user interface (GUI). For example, in one embodiment, the system 30 displays a search form capable of receiving user inputs. FIG. 7 illustrates a representative screen shot of a search input form 500 used to search for a financial product, in accordance with an embodiment of the invention. The search form 500 shown in FIG. 7 is provided by way of example only. Those skilled in the art will appreciate that many different types of form and inputs can be used for querying for a financial product meeting a user's requirements. For example, in one embodiment, the system 30 can store a profile of a given user, where the profile specifies criteria that a user may have concerning financial products of interest and, based on that profile, conduct a search for financial products, automatically or upon request by a user.

Referring again to FIG. 6, based on the search criteria, the system 30 retrieves search results from its databases (step 310). If there are no matches (step 320), the system notifies the user (step 330) and, if the user wants to search again (e.g., using different criteria) (step 340), the system 30 conducts the search again. If the user does not want to search again, the process ends.

Figure 8:
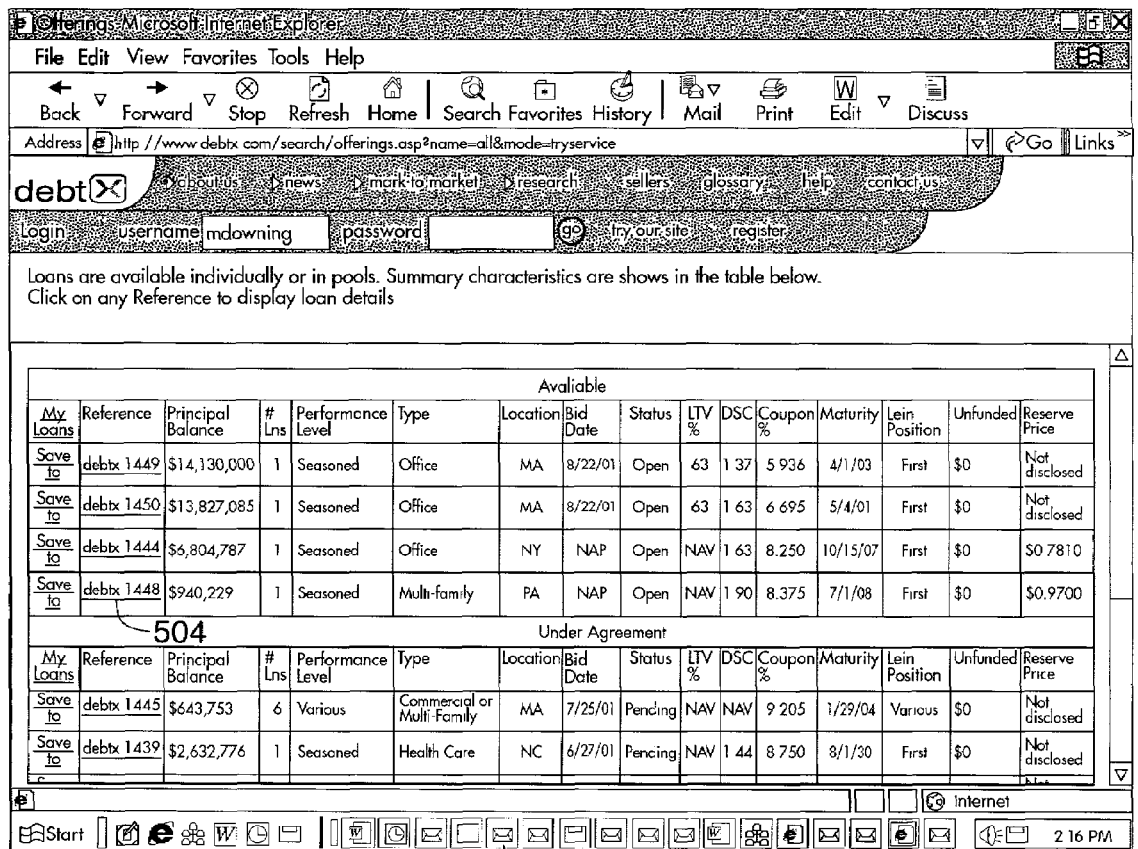
FIG. 8 is a representative screen shot illustrating the results of a search for a financial product, in accordance with an embodiment of the invention.

If there were matches to the search (step 320), the system provides the results to the user (step 350). FIG. 8 is a representative example screen shot illustrating the search results 502 resulting from a search for a financial product, in accordance with an embodiment of the invention. As FIG. 8 illustrates, selected information is provided about the financial products for sale, including the status of the financial product (e.g., "Available" or "Under Agreement"), the loan balance, the type, etc. In this example, a price for the financial product is not provided. As explained further herein, users are able to compute a price for the financial product based on specific requirements and terms. As with the processes of computing a price for Sellers 102, Buyers 100 can use at least one embodiment of the invention to determine an appropriate price for a given financial product, given the current market conditions and the trade history.

Referring again to FIG. 6, a user can request further information, including due diligence materials, about any financial product listed in the search results (step 360). In at least one embodiment of the invention, if the user making such a request is not registered with the system 30 (step 370), the user is prompted to register (step 380) and, if the prompt is accepted (step 390), the appropriate steps are taken to register the user (step 400). If the user declines to register, the process ends and further information about the financial product is not provided. Registration can require the user to provide specific types of information and may require the user to sign or otherwise acknowledge certain obligations, such as confidentiality obligations, relating to the information to be provided to the user.

Registration can include the user reviewing the terms of his or her registration, and, if desired, can review the terms in another format, such as PDF. At this point, the newly registered user can be added to the system 30 using various techniques. For example, the user might be required to print out form, fill it in, and return it to the administrator of the system 30, the system can automatically enroll the user to the system, or the user can be added to the system using a combination of automatic enrollment and filling out forms. Those skilled in the art will appreciate that many different methods for registering users and assigning corresponding authentication information (for example, a username and password) are within the spirit and scope of the invention.

The process shown in steps 370,380, 390, and 400 also can be used, in one embodiment, to obtain additional information from users (registered or otherwise) where applicable. For example, a Seller 102 may have as a condition of its listing the requirement that the system obtain certain additional information from a user before providing some or all of its loan information to a user.

Figure 9:
FIG. 9 is a representative screen shot illustrating the financial product information provided to a user, in accordance with an embodiment of the invention.
Figure 10:
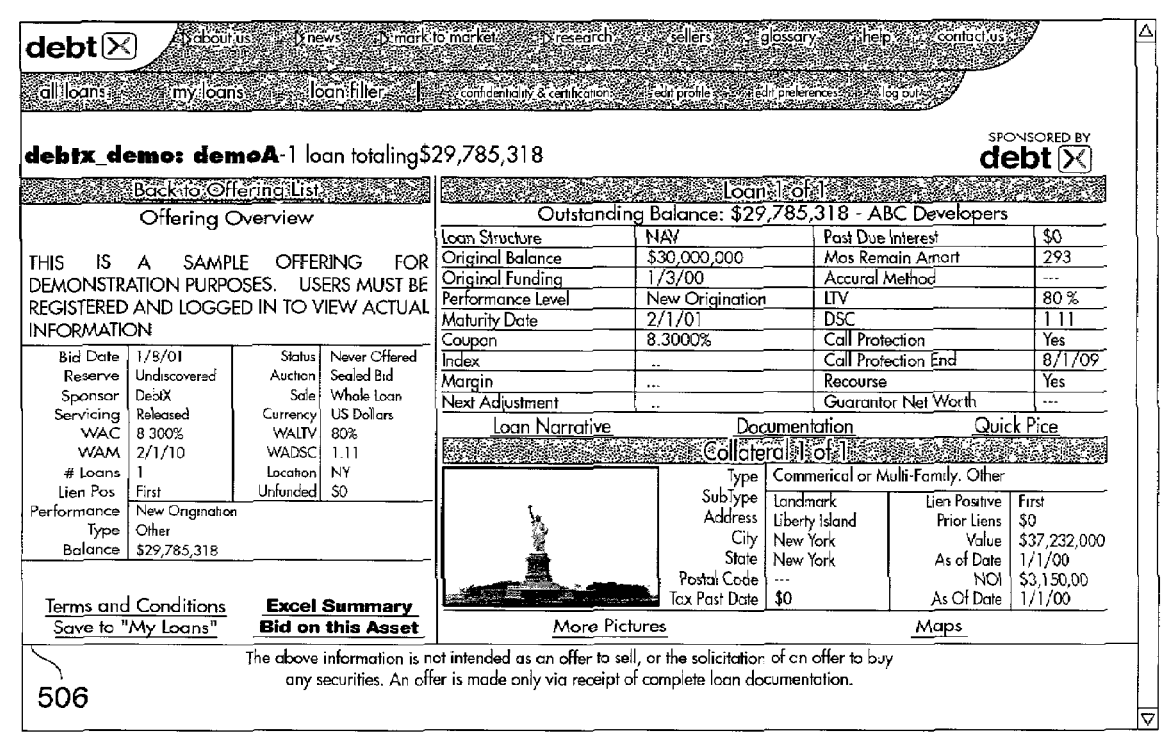

Referring to FIG. 6, when the necessary conditions (e.g., registration or other conditions) are met, the system 30 provides information about the financial product to the user (step 410). A user can, in one embodiment, request this information by "clicking" on a specific listing 504 in the results 502. FIGS. 9 and 10 are representative screen shots illustrating examples of the financial product information provided to a user, in accordance with an embodiment of the invention. As FIGS. 9 and 10 illustrate, the types of information include (but are not limited to) an overview of the financial product, a summary of key information about the financial product, images of collateral (where applicable), a list of documentation available for the financial product (for free or for purchase), and terms of sale. Of course, those skilled in the art recognize that the information provided in the examples of FIGS. 9 and 10 is not limiting.

In one embodiment, a user can obtain a "Quick Price" 508 (FIG. 9) on a loan. To provide this, the system 30 performs a computation similar to the pricing computation performed in the process of FIG. 4, and can give a loan price to a user cents on the dollar, basis points, or other suitable measure.

In one embodiment of the invention, the financial product information includes listings for financial products called "Brokered events." Brokered events are identified by the specific broker sponsoring the deal and are subject to that broker's parameters, including bid type, setting the Reserve Price (if any) documentation, disclosure, and Asset Sale Agreement. Each broker that lists a financial product provides the system 30 with a written statement describing its offering philosophy. That statement can be posted on-line in this section.

Figure 16:
FIG. 16 is a representative screen shot showing an example of a picture of a property associated with a financial product for sale, which picture is available to a user, in accordance with an embodiment of the invention.

Referring again to FIG. 6, the system 30 also can provide more information to the user about the listed financial product, such as loan documentation (step 420) necessary for a buyer's due diligence. A user can obtain this information by clicking on the "buy documents" link 510 shown in FIG. 9. In some embodiments, the system 30 charges the user a fee for these documents. FIGS. 11 through 17 are representative screen shots illustrating some of the types of information that can be provided. FIG. 11 is a representative screen shot illustrating financial product summary information provided to a user, in accordance with an embodiment of the invention. FIG. 12 is a representative screen shot illustrating financial product statistical information provided to a user, in accordance with an embodiment of the invention. FIG. 13 is a representative screen show illustrating financial product collateral information provided to a user, in accordance with an embodiment of the invention. FIG. 14 is a representative screen shot showing an example of a portion of the mortgage note documentation available to a user, in accordance with an embodiment of the invention. FIG. 15 is a representative screen shot showing an example of a portion of the title insurance documentation available to a user, in accordance with an embodiment of the invention. FIG. 16 is a representative screen shot showing an example of a picture of a property associated with a financial product for sale, which picture is available to a user, in accordance with an embodiment of the invention.

Figure 17:
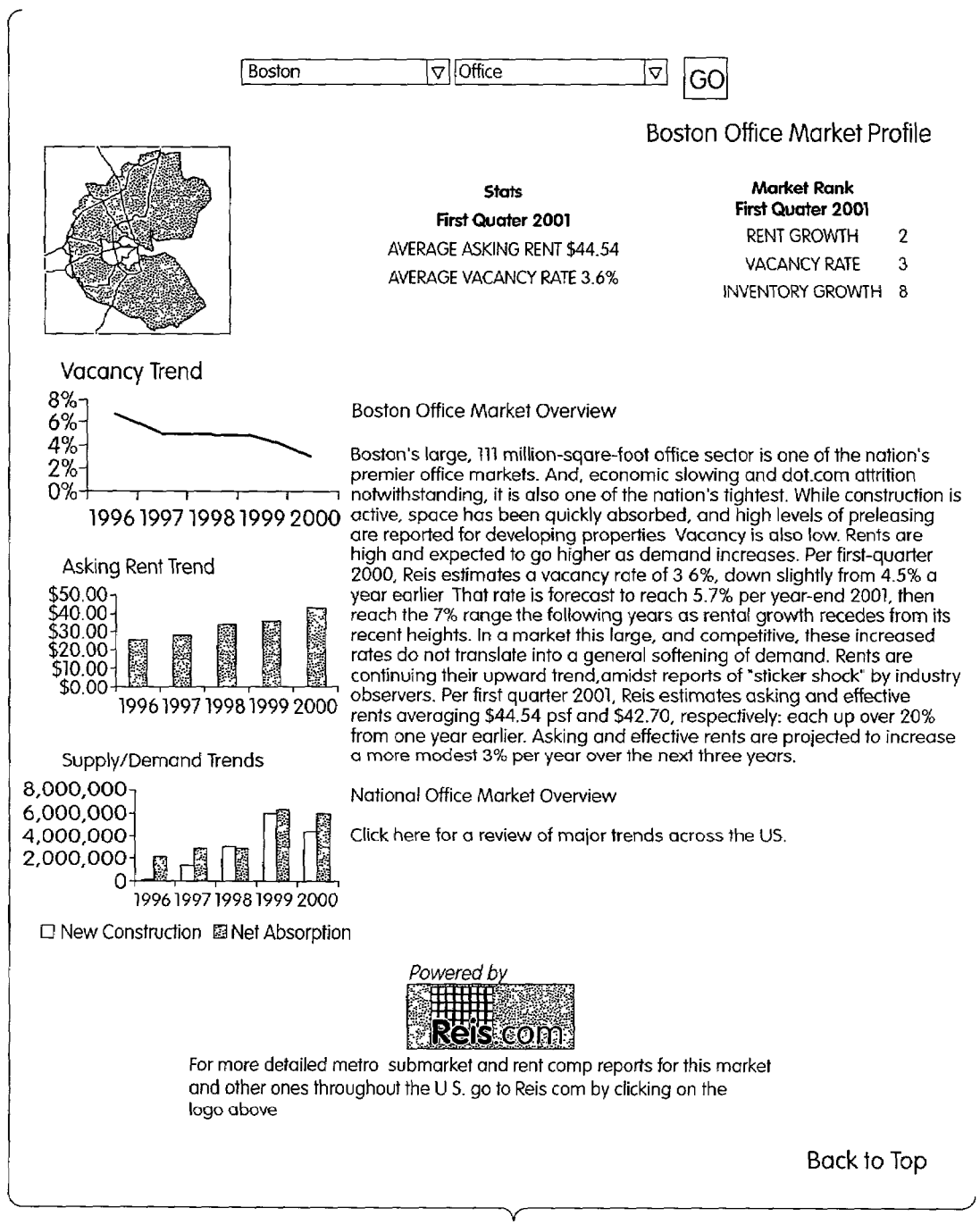
FIG. 17 is a representative screen shot showing an example of third party information available to a user in accordance with an embodiment of the invention.

In addition, in at least one embodiment of the invention, the financial product information provided by a Seller 102 is supplemented with value-added information provided by another entity, such as the administrator of the system 30 and/or third party information. FIG. 17 is a representative screen shot showing an example of third party information available to a user in accordance with an embodiment of the invention. In FIG. 17, the example third party information includes general information provided relating to a geographic area where the collateral for a given financial product may be located.

Referring again to FIG. 9, when appropriate, a user can go from the financial product summary page to a bid process (such as that described in the process of FIG. 30), using the bid link 512. However, in at least one embodiment of the invention, the system 30 tracks whether or not a Buyer 100 who is attempting to bid on a financial product has obtained the due diligence materials. One reason for doing this is to insure that the Seller 102 and/or the system 30 have satisfied NASD requirements for disclosure prior to the sale of a financial product.

In at least one embodiment of the invention, if a user has obtained loan information, such as due diligence materials, the system 30 can provide the user with automatic updates for any additional information relevant to (or that the system 30 receives) about the loan. The updates can, for example, be provided periodically, or as needed, or at the request of a Seller 102, or at the request of a Buyer 100.

Referring again to FIG. 6, the user can take other actions after receiving the results of the search (step 310). For example, the user can compute a price for a listed financial product (step 430), which is explained more fully herein. This can be a "quick price" as described herein, or can be another pricing mechanism, such as that described below. If the time to bid for a financial product is approaching or is a predetermined amount of time away (e.g., three days), the system 30 notifies the user reviewing the information (steps 450 and 460).

A user can also submit questions to the system 30 about a financial product and/or any documentation that the user has received about the financial product (step 470). The queries can be submitted in many different ways, including via a message sent over a computer network, such as an email, via a telephone call or fax to an administrator of the system 30, via a letter, or any other suitable means of communication. The system 30 can respond to the queries (step 480) in similarly varied ways, and need not respond to the user in the manner in which a query was received. If necessary, in at least one embodiment, although not illustrated in FIG. 6, the system 30 can query a Seller 102 for any information or responses needed to respond to the query of a user. If the system 30 has updated financial product information (step 490) to provide to a user, it can do so.

In at least one embodiment, the user can perform actions on the search results not illustrated here, such as "HIDE" and "UNHIDE". With the "HIDE" function, a user may filter the list of search results further by "hiding" any financial products that are not of interest. In this situation, subsequent user searches will not display "hidden" loans. At any time, a user can "UNHIDE" search results to view all posted loans that meet his search criteria.

It should be understood that, in accordance with various embodiments of the invention, steps 410 through 490 can be done in virtually any order and need not be completed in the order shown.

Figure 18:
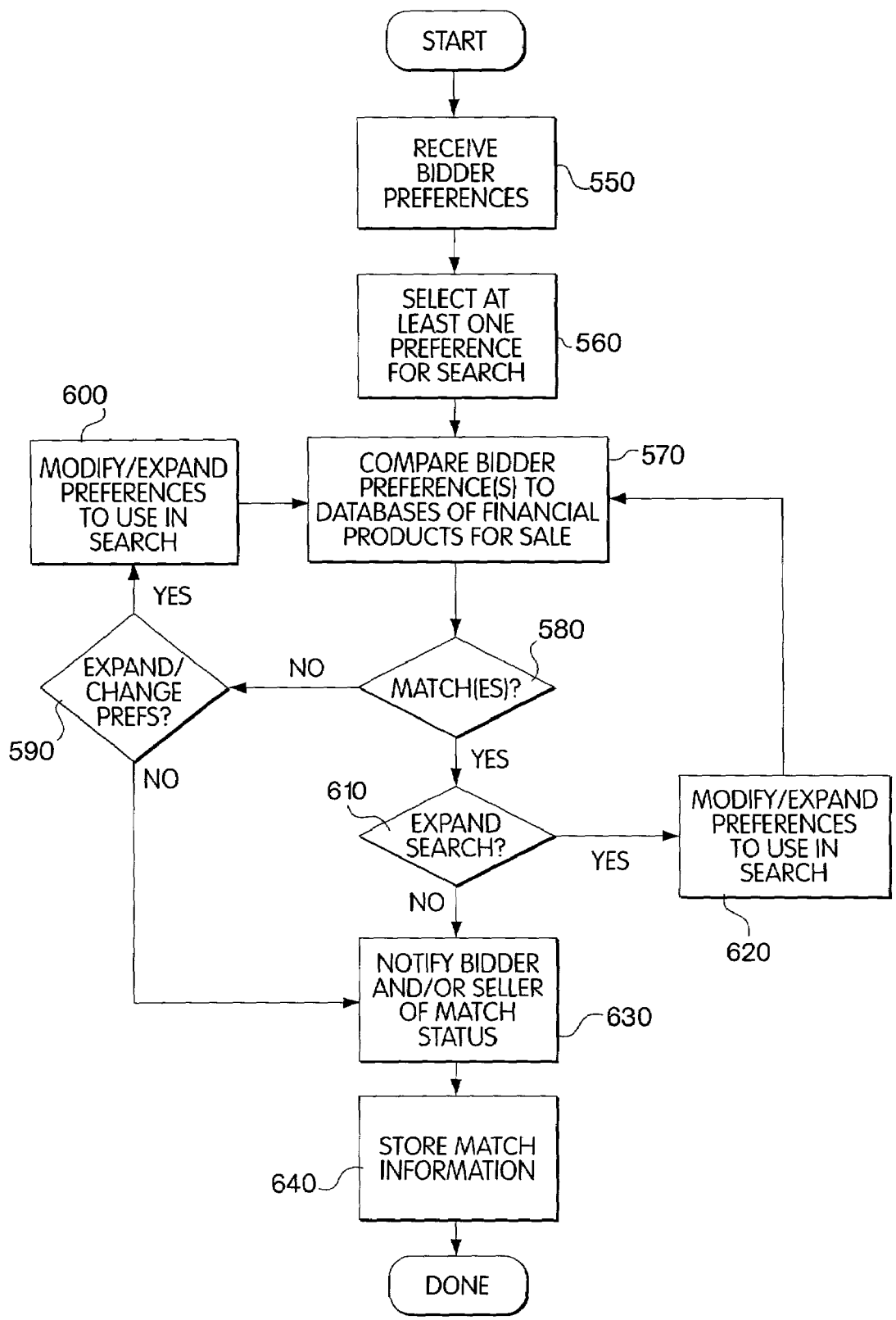
FIG. 18 is a flowchart illustrating a process for searching a database of financial products, in accordance with an embodiment of the invention.

In at least one embodiment of the invention, the system 30 can perform searches of financial products automatically on behalf of any entity for which the system 30 has stored a set of preferences or a profile. This type of search can be done on a periodic basis, or every time a new financial product for sale or information about a financial product for sale is added to the system 30, or any time any characteristic of a financial product changes, or on a basis set by a user (e.g., weekly, daily, etc.). FIG. 18 is a flowchart illustrating a process for automatically searching a database of financial products, in accordance with an embodiment of the invention.

The system 30 receives one or more bidder preferences (step 550), representing one or more criteria that a bidder has for the type of financial product he is looking for. In at least one embodiment, the bidder himself provides the bidder preferences. In at least one embodiment, the system 30 extrapolates at least one bidder preference based on the profile of the bidder. In at least one embodiment, the system extrapolates at least one bidder preference based on a bidder's trading history.

The system 30 selects at least one preference on which to search (step 560), and searches its databases for financial products meeting the criteria in whole or in part (step 570). If no matches are located (step 580), the system can modify the criteria on which it searches (steps 590, 600). For example, if no matches were found using five criteria specified by a bidder, the system 30 could attempt a search using just four of the five criteria. In at least one embodiment, a user can specify whether or not the system 30 can attempt such changes to the criteria.

If matches were found (step 580), the system 30 can still attempt to determine whether the search should be expanded (step 610). For example, if just one or two matches were located, the system 30 may attempt to modify the criteria to expand the results to some predetermined number of matches (step 620).

The system 30 notifies bidders of any matches (or lack thereof) (step 630), and can, if desired, store the results of its searches (step 640). The notification can be by any suitable means, including email messages, postings to a personalized web page (which the system 30 can maintain for a bidder), telephone messages, fax messages, pager messages, letters, so-called "Instant" messages sent to a mobile communications device, and the like. The stored results can be used, for example, at a later time, such as when a bidder logs on to the system 30 and seeks more information about the financial products being sold.

Figure 19:
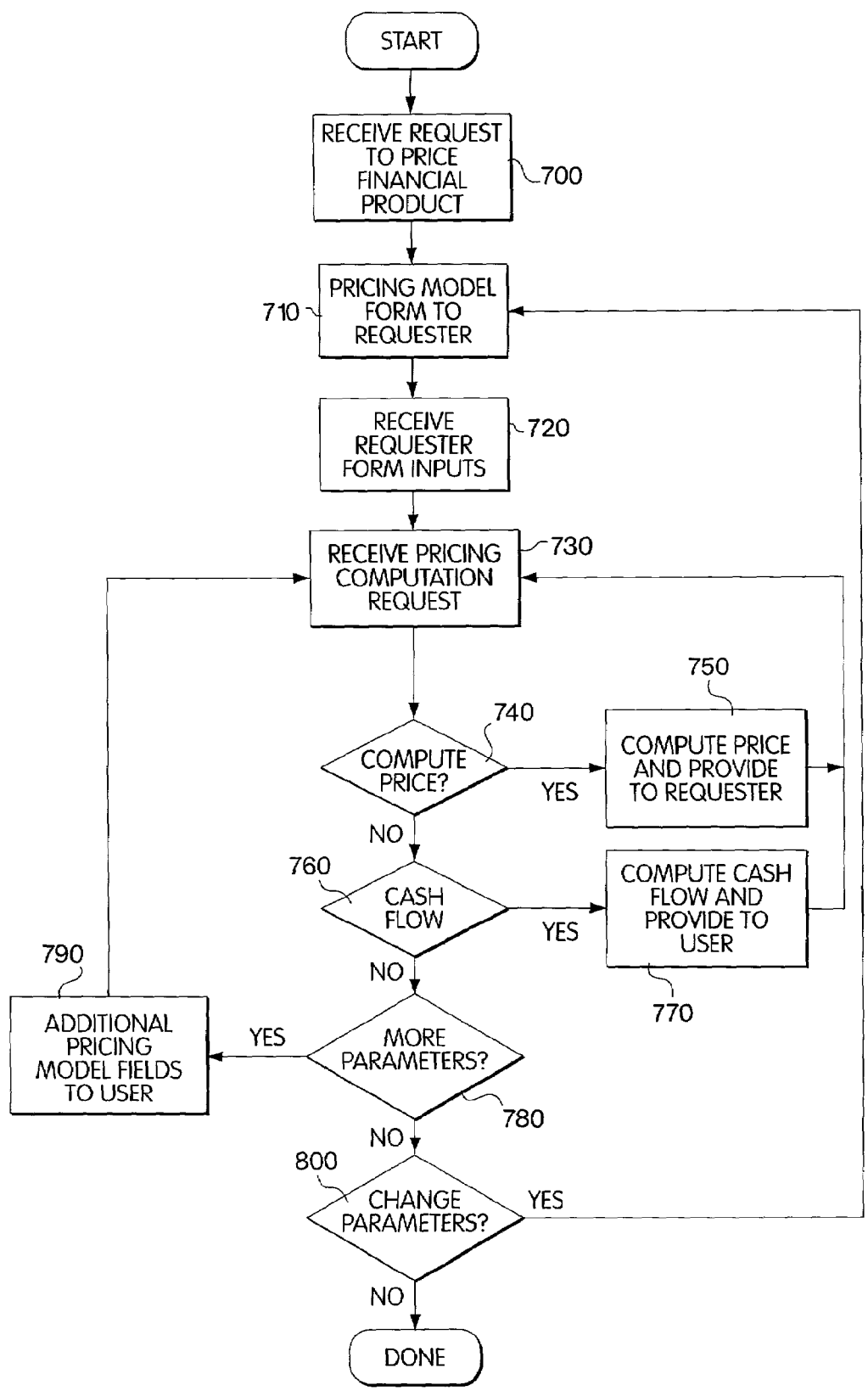
FIG. 19 is a flowchart illustrating a process for pricing a financial product, in accordance with an embodiment of the invention.

As noted previously, users of the system 30 (including at least Buyers 100, Sellers 102, and visitors/others) can price financial products offered for sale on the system 30. FIG. 19 is a flowchart illustrating a process for pricing a financial product, in accordance with an embodiment of the invention.

A user of the system can submit a request to the system 30 to price a financial product (step 700), and the system 30 provides the user with a pricing model form (step 710). FIG. 20 is a representative screen shot illustrating a pricing form 810 for pricing a financial product, in accordance with an embodiment of the invention. As FIG. 20 indicates, users input the characteristics of the financial product they are interested in purchasing, such as the type of product, the principal balance, etc. Generally, the characteristics the user enters correspond to the information that the user has received about a financial product. However, in at least one embodiment, the user's entries can deviate from the listed information. For example, a user may want to calculate a cash flow for a financial product that assumes a different interest rate than currently listed for the product.

The system 30 receives the pricing computation request (step 730), and, if requested (step 740) computes a price (step 750) for the financial product. In at least one embodiment, the computation is done in substantially the same way as the computation done for a seller seeking a price (see FIG. 4). For example, in FIG. 20, if the user presses the "calculate" button 812, the system 30 returns a calculated price, such as in cents on the dollar, basis points, or other suitable measure, for the value of the financial product. FIG. 21 is a representative screen shot illustrating a form for performing a computation on a financial product, in accordance with an embodiment of the invention, and FIG. 22 is a representative screen shot illustrating the results of the computation requested in the screen shot of FIG. 21, in accordance with an embodiment of the invention. In FIG. 22, the computation results in a price of "99.3 cents on the dollar" for the listed financial product, which is a loan having a principal balance of five million dollars, performing as agreed.

Figure 23:
FIG. 23 is a representative screen shot illustrating a spreadsheet showing yearly cash flow, in accordance with an embodiment of the invention.

Referring to FIG. 19, if the user request "cash flow" (step 760) the system 30 computes a cash flow, such as monthly or annually (step 770). FIG. 23 is a representative screen shot illustrating a spreadsheet showing yearly cash flow, in accordance with an embodiment of the invention.

Referring to FIG. 19, in at least one embodiment of the invention, a user can compute the price of a financial product based on addition parameters (step 780), which the user can provide or which the system 30 can provide (step 790). For example, the system 30 provides pull down menus permitting users to perform computations such as foreclosure, extension/restructure, and Direct Pay Off (DPO)/Early Payoff.

FIG. 24 is a representative screen shot illustrating a form for performing a foreclosure computation on a financial product, in accordance with an embodiment of the invention, and FIG. 25 is a representative screen shot illustrating the results of the computation requested in the screen shot of FIG. 23, in accordance with an embodiment of the invention.

FIG. 26 is a representative screen shot illustrating a form for performing an extension/restructure computation on a financial product, in accordance with an embodiment of the invention, and FIG. 27 is a representative screen shot illustrating the results of the computation requested in the screen shot of FIG. 25, in accordance with an embodiment of the invention.

FIG. 28 is a representative screen shot illustrating a form for performing an DPO/Early Payoff computation on a financial product, in accordance with an embodiment of the invention, and FIG. 29 is a representative screen shot illustrating the results of the computation requested in the screen shot of FIG. 27, in accordance with an embodiment of the invention. Of course, the options provided are by way of example only and are not limiting. The additional parameters that can change the price computation can vary depending on the financial product.

Figure 30:
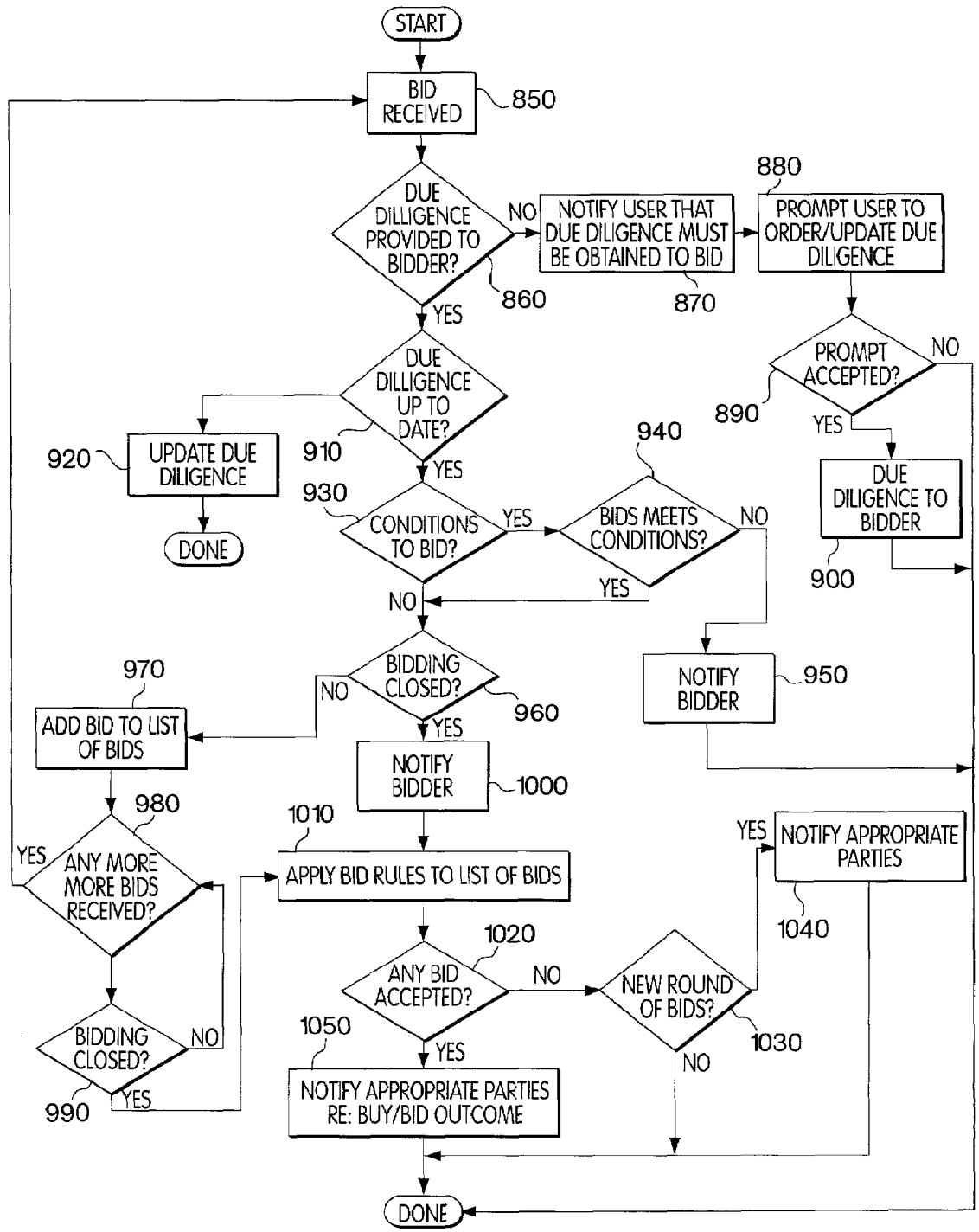
FIG. 30 is a flowchart illustrating a process for bidding on a financial product, in accordance with an embodiment of the invention.

At least one embodiment of the invention permits users to bid on a financial product offered for sale. FIG. 30 is a flowchart illustrating a process for bidding on a financial product, in accordance with an embodiment of the invention. The invention is, in one embodiment, implemented in accordance with a standard bidding police to enable users to bid on a loan. In at least one embodiment the Seller 102 can specify a bidding policy to be applied to a given financial product. Table 3 lists examples of bidding policies usable in accordance with some embodiments of the invention:

TABLE 3

Example Bidding Policy

| | |
|---|---|
| Sealed Bid | Bids must be received on or before the stated bid deadline and are not reviewed prior to the deadline. No bidder is aware of other bid amounts or conditions. A Sealed Bid forum may or may not be subject to a Reserve Price. |
| Modified Sealed Bid | Financial product is offered firm at a specified price for a specified period. Converts to Sealed Bid after firm offer period expires. |
| Open Auction | Bids are received on an ongoing basis up to the bid deadline. All bids and conditions are posted for all existing and potential bidders to review. Bidders may make multiple bids on any financial product provided that each subsequent bid is an improvement over the most recent bid submitted. An Open Auction may or may not be subject to a Reserve Price. |
| Indicative | Indicative bidding is generally a two-stage process whereby the seller/broker solicits a first round indication of what a buyer might pay for an asset. After a review of the indicative bids, the seller/broker generally chooses one or more bidders to confirm or improve their bid, usually requiring this be done within a specified period of time. The bidders chosen to participate in this second round are generally chosen based upon their bids and the seller/broker's opinion of their ability to close. |
| Negotiated | Buyers and Sellers negotiate the final sale price. This may be conducted before or after a request for Indicative Bids. |
| Firm Offer | A firm price is listed and the financial product will not sell until a bidder agrees to the listed price. The seller has the right to accept or reject nonconforming bids. |

It should be understood that the invention can be implemented to accommodate virtually any transaction format that a Seller 102, Buyer 100, or other party (e.g., broker) wishes to utilize.

Referring again to FIG. 30, when the system 30 receives a bid for a financial product (step 850), the system checks to ensure that the bidder has obtained the appropriate documentation (e.g., due diligence materials) associated with the financial product (step 860). In at least one embodiment, the system 30 can confirm whether or not the user has received all updates (if any) to the due diligence materials, as well. If the bidder has not obtained these materials (either by purchasing them from the system 30 or by otherwise proving to the system 30 that the bidder has obtained and/or reviewed the materials), the system 30 notifies the bidder that the bidder cannot bid until due diligence materials/update due diligence materials are obtained (step 870) and prompts the user to order them or to otherwise obtain them (step 880 and Steps 910, 920). If the bidder declines this prompt (step 890), the process ends and the system 30 does not proceed further with the user's bid. If the bidder accepts the prompt, the system 30 can provide the bidder with the required due diligence materials/due diligence updates (step 900). Although FIG. 30 illustrates the process ending for the bidder at that point, the bidder can, in one embodiment, restart the process at step 850, now that the bidder has acquired the required due diligence materials.

The system 30 also checks to determine whether or not there are conditions on the financial product being offered that may affect the bid and/or the bidder (steps 930, 940). For example, a given Seller 102 may have a condition prohibiting one or more specific bidders (or types of bidders) from being able to bid on a given financial product. If the bid conditions are not met (step 940), the bidding process ends for that bidder. In at least one embodiment, if a bidder and/or a bid are denied because of a condition on the bid or bidder, the system 30 provides a notification (step 950).

If bidding is not yet closed (step 960), the bid is added to a list of bids (step 970), which can, in one embodiment, be presented to a Seller 102. The list of bids can also be maintained by the system 30 for the system 40 to select a "winning" bid, in accordance with one or more conditions. If more bids are received (step 980) while bidding remains open (step 990), each bid is similarly evaluated as recited for steps 850 through 960, described above. Although not illustrated in FIG. 30, if a bidder's bid is added to the list of bids, the system 30 can notify the bidder and/or other interested parties (e.g., the Seller 102) as to that fact.

If bidding is closed before a bid is accepted, in at least one embodiment, the system 30 notifies the bidder (step 1000).

Once bidding is closed, the system 30 can, in at least one embodiment, apply one or more bid rules (step 1010) to the list of bids to determine a winning bid, or to determine whether any bids meet the requirements of the bidding rule(s) (step 1010). For example, if a Seller 102 imposes a condition to accept the "highest price" bid, the system 30 will determine that from the list of bids. Those skilled in the art will appreciate that other conditions are usable within the spirit and scope of the invention.

In one embodiment, once bidding is closed, the system 30 provides the list of bids to the Seller 102, and the Seller 103 (or any entity designated by the Seller 103, such as a broker or other agent) can determine a winning bid.

If no bids are accepted (step 1020), the system 30 can, if desired by the Seller 102, conduct a new round of bidding (step 1030). This can occur, for example, when a Seller 102 decides to change one or more parameters, decides to change the mix of financial products in a pool, decides to wait longer for different/better bids, if a Seller 102 authorizes it, etc. This also can occur automatically, such as if a Seller 102 specifies this in advance. If this occurs, the appropriate parties (e.g., bidders and potential bidders, the Seller 102, etc.) are notified (step 1040) and the process ends, to be restarted at step 850. If a new round of bids is not requested (step 1030), the process ends.

If a bid is accepted (step 1020), the system 30 notifies appropriate parties about the bid outcome (step 1050). This notification can be just to the Buyer 100 and Seller 100, or can, if authorized, be sent to all "losing" bidders.

Thus, it can be seen that at least some embodiments of the present invention provide an efficient marketplace for trading financial products, such as commercial debt, and may provide an open, market-driven exchange that reduces transaction costs, compresses transaction cycles, and enables extended buyer and seller participation in the markets such as the secondary commercial debt market. In at least one embodiment, the invention provides a pricing model that gives sellers an indication of an asset's market value given its individual characteristics and prevailing market conditions.

By posting financial products to websites and portals associated with some embodiments of the invention, sellers of financial products are able to reach the broadest qualified investor audience in the most efficient manner. In addition, buyers and other investors in financial products benefit from the ability to access and evaluate investment opportunities from a central location.

Variations, modifications, and other implementations of what is described herein will occur to those of ordinary skill in the art without departing from the spirit and the scope of the invention as claimed.

It should be understood that virtually any aspect of the embodiments of the invention described herein can be implemented using software, hardware, or in a combination of hardware and software. For example, at least the listed descriptions of "logic," referenced herein can be implemented in hardware, software or a combination.

As those skilled in the art will recognize, the invention described herein can be modified to accommodate and/or comply with any one or more of the above-described technologies and standards. In addition, variations, modifications, and other implementations of what is described herein can occur to those of ordinary skill in the art without departing from the spirit and the scope of the invention as claimed.

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

It also should be noted that the previous illustrations of screen shots, together with the accompanying descriptions, are provided by way of example only and are not limiting. Those skilled in the art will recognize that many different designs of interfaces, screen shots, navigation patterns, and the like, are within the spirit and scope of the invention.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. A computerized method for trading financial products over a computer network, comprising:

receiving seller information from a first client device over said network, the seller information relating to a financial product offered for sale on behalf of a seller, at least some of the seller information comprising due diligence information, the due diligence information fulfilling at least a portion of a request for due diligence on the financial product;

storing the seller information about the financial product in a database;

making the due diligence information available over said network to a second client device on behalf of a potential buyer of the financial product;

storing in the database data of whether a potential buyer has obtained said due diligence information; and storing in the database a bid for the financial product from the second client only if the second client has obtained the due diligence information, wherein said bid is data comprising at least an amount offered to purchase said financial product.

2. The computerized method of claim 1, wherein the step of receiving seller information over the network further comprises receiving diligence information comprising an electronic representation of a physical due diligence document.

3. The computerized method of claim 2, wherein the step of receiving seller information over the network further comprises receiving diligence information comprising an electronic image substantially replicating the physical due diligence document.

4. The computerized method of claim 2 further comprising the step of receiving a request from a second client device for at least some information relating to the financial product.

5. The computerized method of claim 1 further comprising the step of providing a second client device with a list comprising at least one financial product offered for sale.

6. The computerized method of claim 1 further comprising the step of searching the database for at least one financial product meeting a condition provided by a second client device.

7. The computerized method of claim 1 further comprising the step of providing at least one stored bid to the first client device.

8. The computerized method of claim 1 further comprising the step of accepting a stored bid if the stored bid satisfies the seller.

9. The computerized method of claim 8, wherein the step of accepting a stored bid if the bid satisfies the seller further comprises receiving a notification that the seller has accepted the stored bid.

10. The computerized method of claim 8, wherein the step of accepting a bid if the bid satisfies the seller further comprises determining that the stored bid meets a predetermined condition set by the seller.

11. The computerized method of claim 8 further comprising the step of storing data of trade history information in the database, the trade history information relating to at least one bid for a financial product that was accepted.

12. The computerized method of claim 11, wherein the step of storing information in the database relating to at least one accepted bid further comprises storing information about at least one of the following: terms of the bid, terms of the financial product, time periods, conditions, locations, appraisals, discounts, liens, status, sponsors, servicing type, status, maturity, principal balance, financial product type, origination date, monthly payment, maturity date, interest rate, interest accrual method, and performance level.

13. The computerized method of claim 1 further comprising the step of computing a price for the financial product.

14. The computerized method of claim 11 further comprising the step of computing a price for the financial product, wherein the step of computing the price for the financial product is based at least in part on at least one of the following: market information, seller information, due diligence information, and trade history information.

15. The computerized method of claim 14, wherein the market information includes at least one indicator selected from the group consisting of U.S. Federal Funds rate, U.S. prime rate, bond rate, U.S. Treasury bill rate, U.S. Treasury bond rate, U.S. Treasury note rate, S&P 500 index, Dow Jones Industrial Average, and NASDAQ Combined Composite Index.

16. A computerized exchange apparatus for trading financial products, wherein the exchange is accessible using a computer network, comprising:
a server in operable communication with a client, the server programmed for receiving requests from a client to price a financial product offered for sale;
a pricing engine in communication with the server, the pricing engine computing a price for the financial product offered for sale, the price based at least in part on at least one of the following: market information, information that the seller has provided about the financial product, information that the client provides about the financial product, due diligence information, and trade history information; and
a database storing information relating to the least one financial product offered for sale and the computed price for that financial product,
wherein the server is further programmed to provide the seller of the financial product with a bid on a financial product that was received from a bidder only if the bidder has received the due diligence information from the computerized exchange apparatus.

17. The computerized exchange apparatus of claim 16, wherein the information relating to the at least one financial product for sale farther comprises due diligence information, the due diligence information capable of fulfilling at least a portion of a request for due diligence on the financial product.

18. The computerized exchange apparatus of claim 16, wherein the server is further programmed to provide information about the financial product to a client in response to a request for information from the client.

19. A computerized apparatus for trading financial products, comprising:
means for receiving information about at least one financial product for sale, the information including due diligence information capable of fulfilling at least a portion of a request for due diligence on the financial product;
means for storing data relating to due diligence information;
means for computing a price on the financial product, the price based at least in part on at least one of the following: market information, information received about the financial product, due diligence information, and trade history information;
means for providing a potential bidder on the financial product with the due diligence information and a price for the financial product; and
means for storing a bid on the financial product only if the bidder has received the due diligence information on the financial product from the computerized apparatus.

20. A computerized method for trading financial products over a computer network, comprising:
receiving seller information from a first client device over said network, the seller information relating to a financial product offered for sale on behalf of a seller, at least some of the seller information comprising due diligence information, the due diligence information fulfilling at least a portion of a request for due diligence on the financial product;
storing the seller information about the financial product in a database;
making the due diligence information available over said network to a second client device on behalf of a potential buyer of the financial product before a bid is entered, said bid being data comprising at least an amount offered to purchase said financial product; and
storing in the database a bid for the financial product from the second client if the second client has obtained the due diligence information.

21. A computerized method for trading financial products over a computer network, comprising:
receiving seller information from a first client device over said network, the seller information relating to a financial product offered for sale on behalf of a seller, at least some of the seller information comprising due diligence information, the due diligence information fulfilling at least a portion of a request for due diligence on the financial product;
storing the seller information about the financial product in a database;
making the due diligence information available over said network to a second client device on behalf of a potential buyer of the financial product;
storing in the database data relating to whether or not a potential buyer has obtained said due diligence information; and
storing in the database a bid for the financial product from the second client if the second client has obtained the due diligence information, wherein said bid is data comprising at least an amount offered to purchase said financial product.

22. A computerized method for trading financial products over a computer network, comprising:
receiving seller information from a first client device over said network, the seller information relating to a financial product offered for sale on behalf of a seller, at least some of the seller information comprising due diligence information, the due diligence information fulfilling at least a portion of a request for due diligence on the financial product;
storing the seller information about the financial product in a database;
making the due diligence information available over said network to a second client device on behalf of a potential buyer of the financial product;
storing in the database data relating to whether or not a potential buyer has obtained said due diligence information; and
storing in the database a bid for the financial product from the second client, wherein said bid is data comprising at least an amount offered to purchase said financial product.

* * * * *